United States Patent [19]

Demarest et al.

[11] 4,106,085
[45] Aug. 8, 1978

[54] HVDC FLOATING CURRENT ORDER SYSTEM

[75] Inventors: Donald M. Demarest, Wallingford; Bernard D. Leete, Newtown Square, both of Pa.

[73] Assignee: General Electric Company, Philadelphia, Pa.

[21] Appl. No.: 754,475

[22] Filed: Dec. 27, 1976

[51] Int. Cl.² ............................................. H02M 5/45
[52] U.S. Cl. ........................................ 363/51; 363/79
[58] Field of Search ................................ 363/51, 79

[56] References Cited

U.S. PATENT DOCUMENTS

| | | | |
|---|---|---|---|
| 3,036,257 | 5/1962 | Uhlmann | 363/51 X |
| 3,470,442 | 9/1969 | Ainsworth | 363/79 X |
| 3,707,669 | 12/1972 | Kanngiesser et al. | 363/51 |
| 3,832,620 | 8/1974 | Pollard | 363/79 |
| 3,906,335 | 9/1975 | Watanabe et al. | 363/79 X |

Primary Examiner—William M. Shoop
Attorney, Agent, or Firm—William Freedman; Carl L. Silverman; Charles W. Helzer

[57] ABSTRACT

An HVDC electric power delivery system having a floating current order current control subsystem is described. The system is comprised by power converters at each end of an HVDC power conductor link each of which includes a plurality of controllable electric valves connected between alternating current and the direct current electric power conductors together with means for cyclically firing the valves in a predetermined sequence and at firing angles measured with respect to the alternating voltage that can be varied to control the flow of power between the alternating current system and the direct current system. Each of the power converters further includes a regulator for comparing a plurality of input control signals which respectively represent different predetermined operating characteristics of the HVDC system during operation and for deriving an output error control signal that controls the firing angles of the valves. The present invention makes available a floating current order control subsystem which is coupled to the regulator of each power converter for supplying thereto as one of the input control signals a floating current order control signal representative of the magnitude of the direct current flowing in the direct current power conductors plus a predetermined current margin whose polarity is determined by the direction of power flow. The floating current order control subsystem further includes rate limiting means for limiting the rate of change of the floating current order control signal to some predetermined rate of change value either in an increasing or decreasing magnitude direction and maximum and minimum boundary setting limits for setting predetermined maximum and minimum magnitude value limits above and below which the floating current order control signal is not allowed to change the load current magnitude so that the load current magnitude is maintained within predetermined maximum and minimum load current values.

34 Claims, 11 Drawing Figures

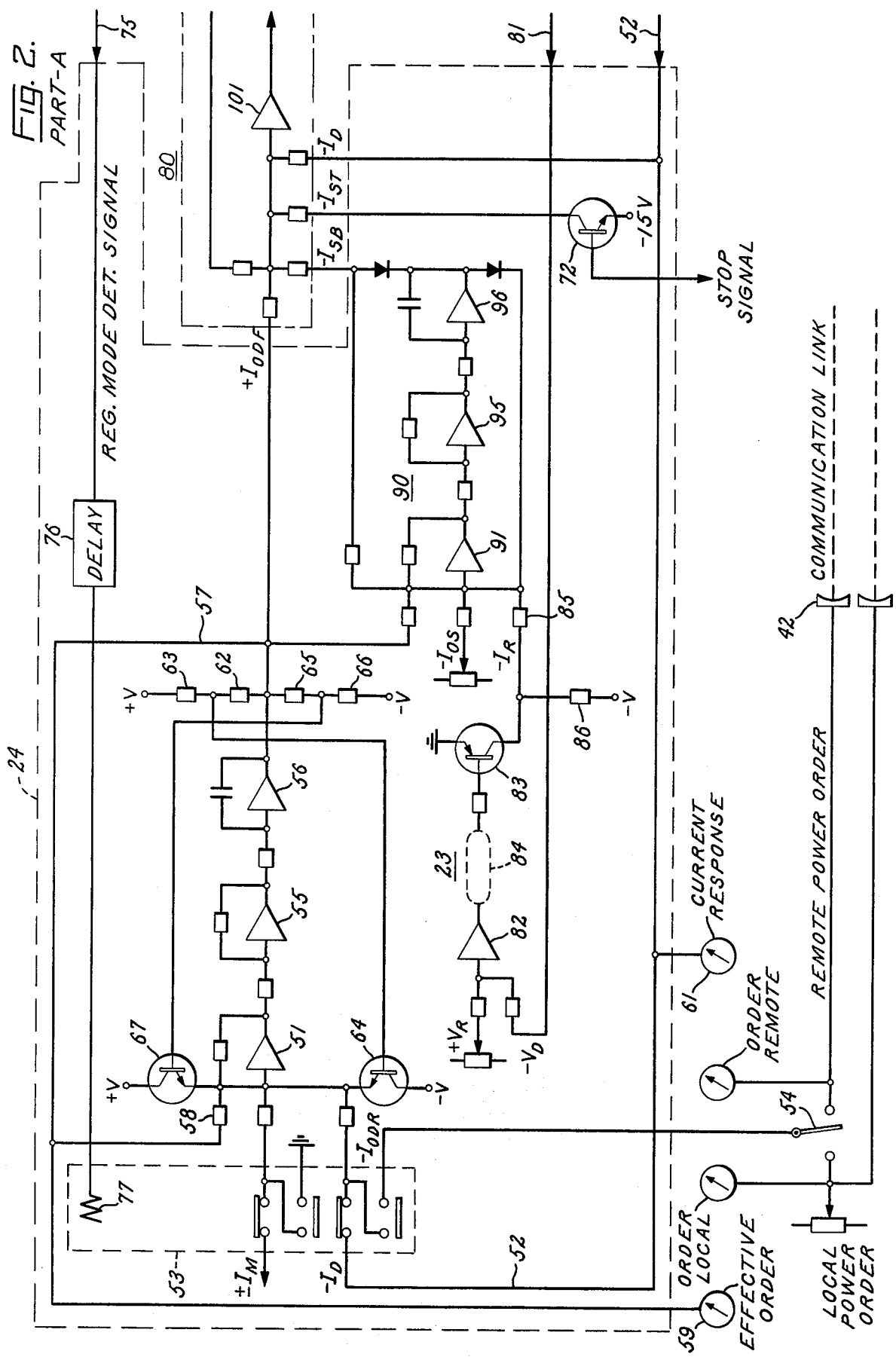
Fig. 2. PART-A

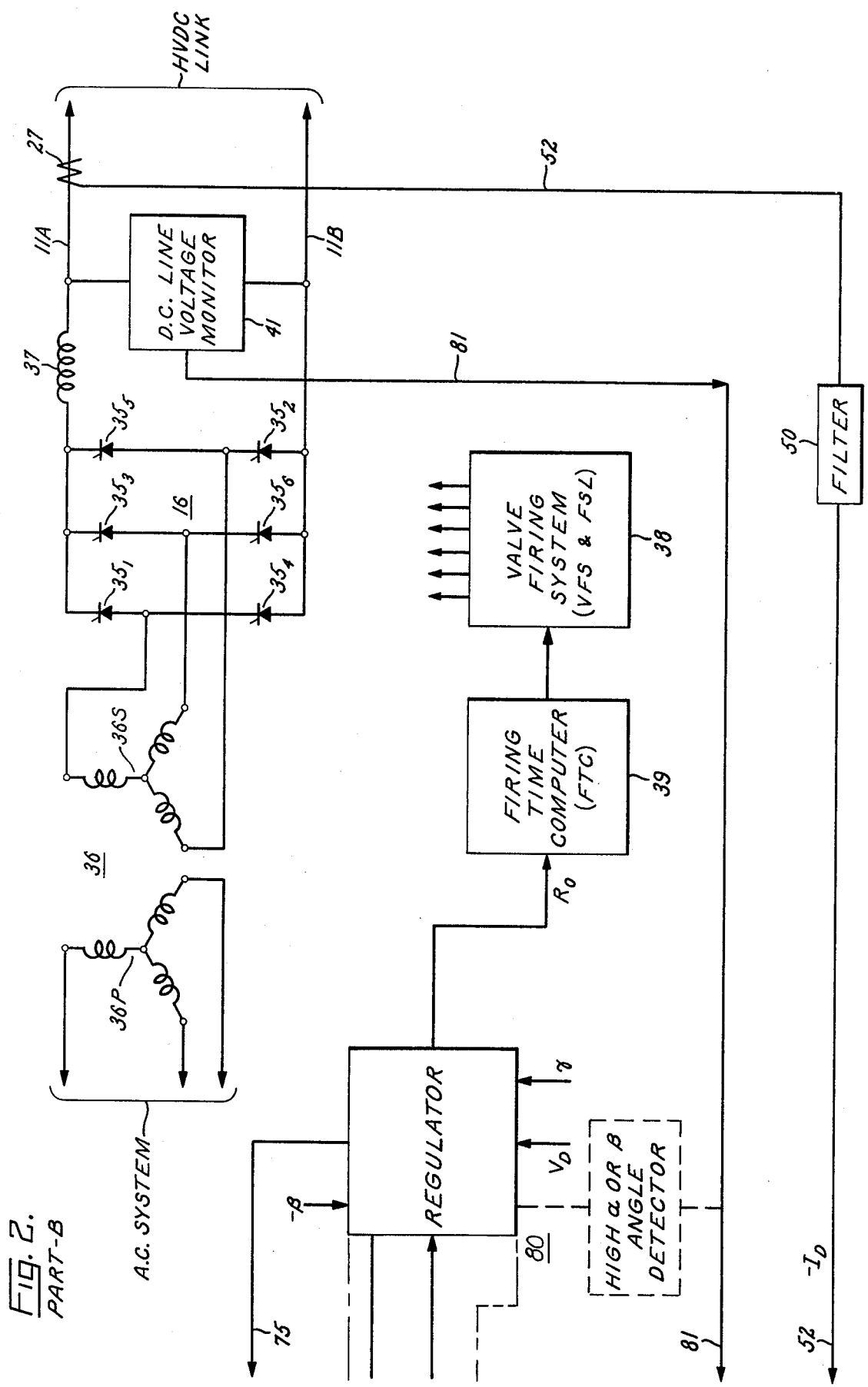
Fig. 2. PART-B

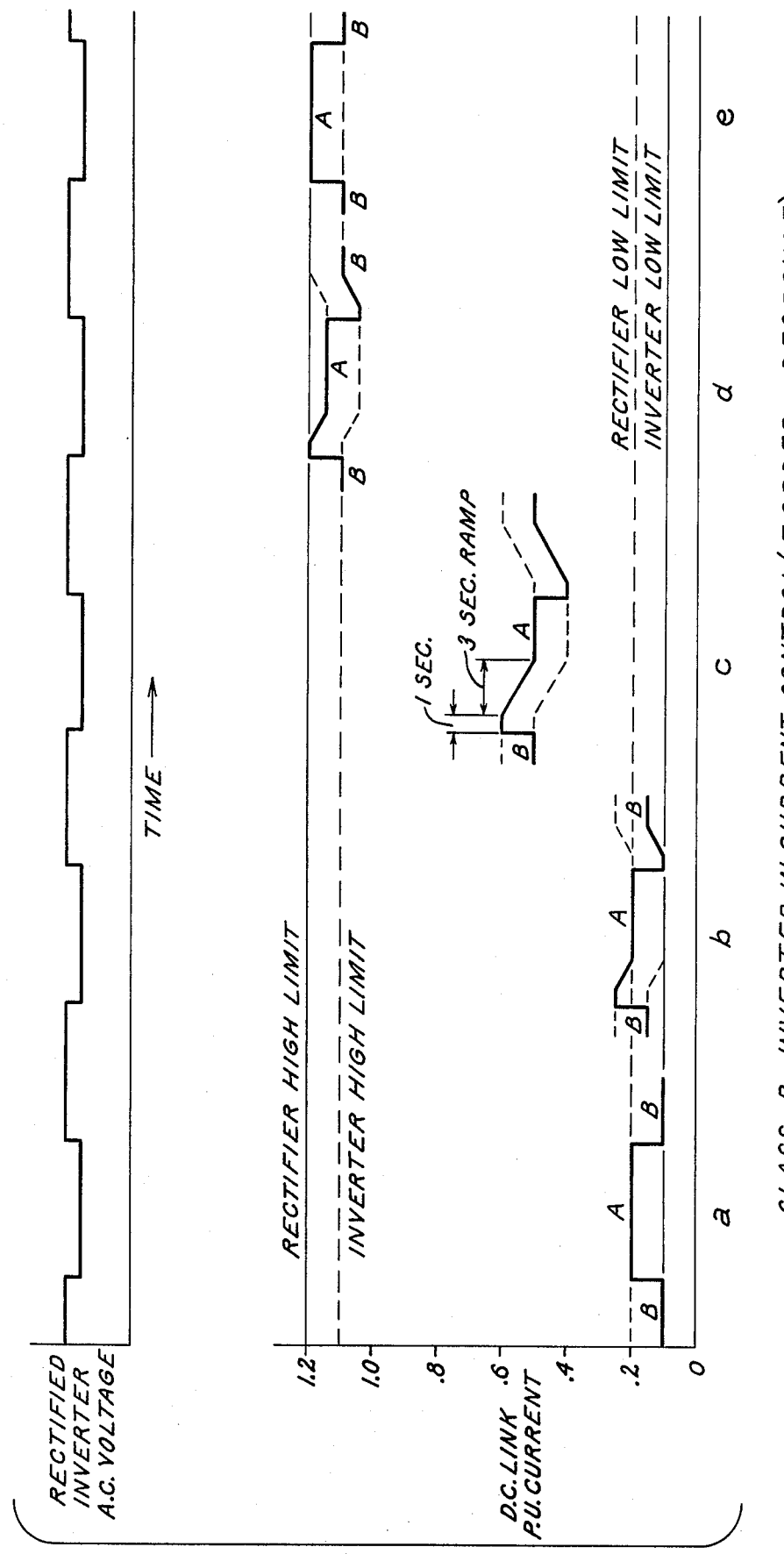

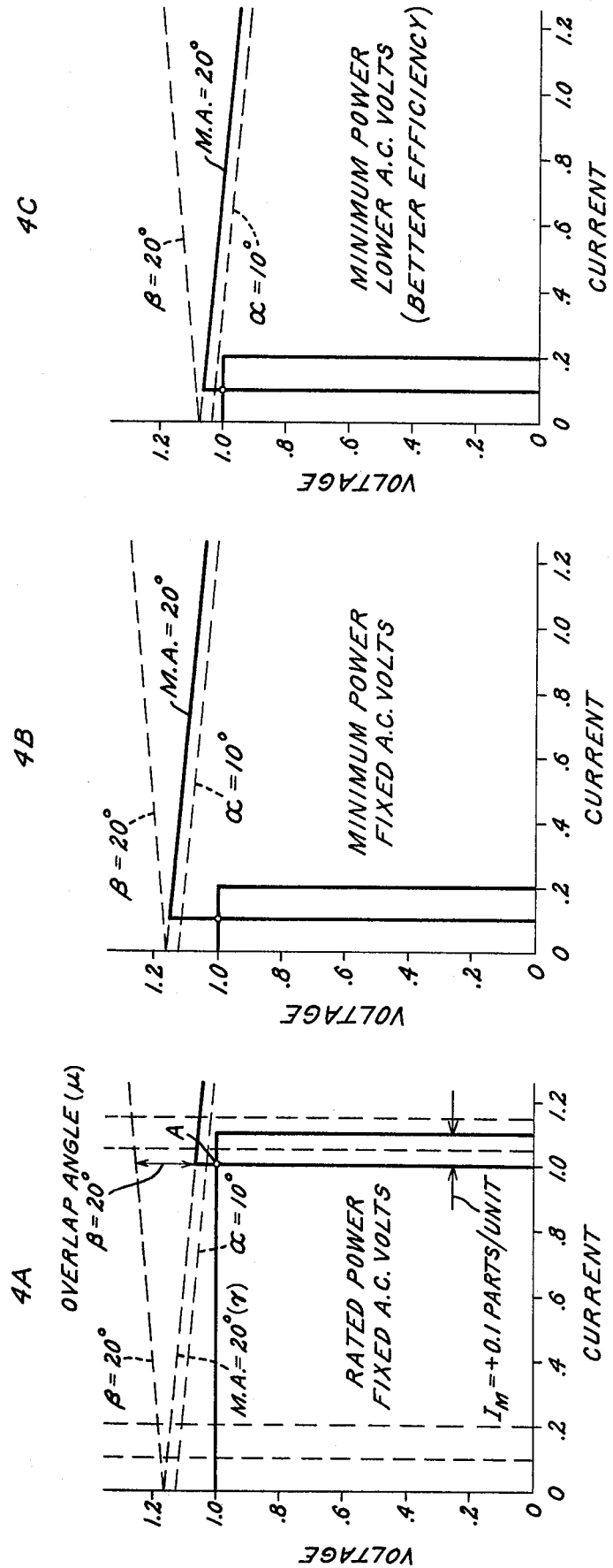

PART-A

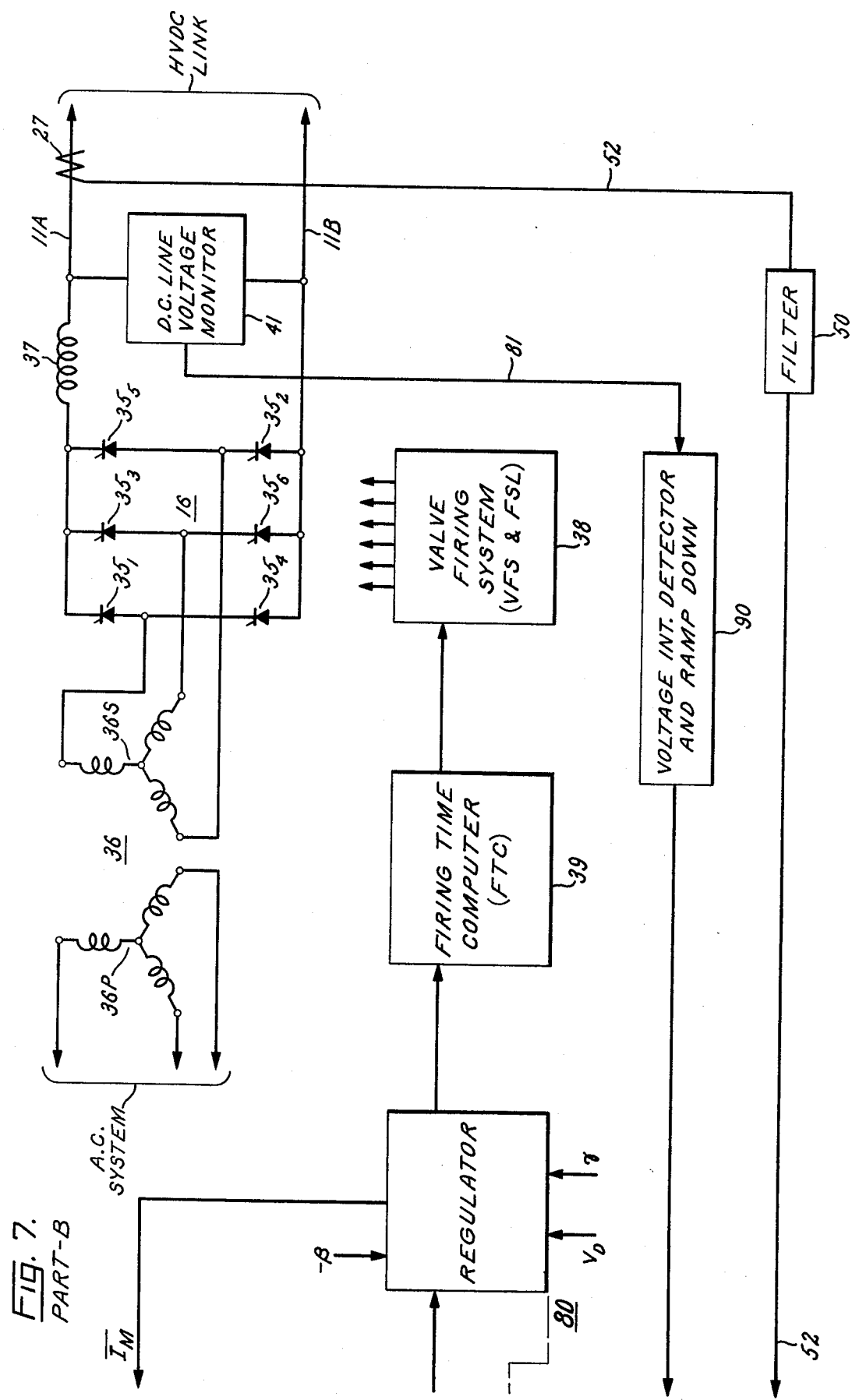
FIG. 7. PART-B

HVDC FLOATING CURRENT ORDER SYSTEM

BACKGROUND OF INVENTION

1. Field of Invention

This invention relates to a new and improved high voltage direct current (HVDC) power transmission system employing a novel floating current order control subsystem.

More specifically, the invention relates to such an HVDC system wherein a novel floating current order control subsystem is included for developing a continuously available floating current order control signal which is representative of the magnitude of the direct current flowing in the HVDC link at a given time plus or minus a predetermined current margin and which goes up or down in magnitude value with changes in the HVDC system direct current magnitude. This floating current order control signal is provided as one of the operation-regulating input control signals to the regulator of the power converter of the HVDC system which is not in current control at the time. There are at least two power converters in an HVDC system, one at each end of the HDVC power link, and each power converter may be provided with a floating current order control subsystem although only one is effective at any given time to effect nearly "bumpless" transfer of control of current from one power converter to the other should such transfer of current control be required during operation of the system.

2. Prior Art Problem

During the start-up and shut-down, and even under normal running of an HVDC system, it is anticipated that certain transient conditions can occur such as rectifier and/or inverter voltage interruptions in the form of voltage dips or loss. The occurrence of such transient conditions may result in a mode switching change in the control of the regulator of the power converter subjected to such transient condition. Such operating mode switching changes are described in detail in U.S. Pat. No. 3,832,620 issued Aug. 27, 1974 entitled "Regulating Mode Selector Scheme for an Electric Power Converter" by Ernest M. Pollard, assigned to the General Electric Company. Mode changes usually involve a shift in the control of the current flowing in the HVDC link from one power converter to the other. In known HVDC systems, a communications link is relied upon to communicate the current order in an attempt to achieve as close to a "bumpless" shift as possible, (i.e. a shift which is not accompanied by a substantial change in direct current magnitude if a mode change occurs.) In the event there is a loss in the communications link (due for example to a storm) then the need to change current order may not be communicated to the opposite power converter. In such eventuality, complications can develop in the operation of the HVDC system possibly accompanied by an unintentional reversal in power flow through the system.

To avoid such complications in the absence of communications and still allow current order changes as long as the end where the change originates remains in current control, the present invention was developed. Normally, the end where the current order change originates is designed to be in current control. It only loses current control during abnormal conditions which are usually temporary in nature. Therefore, for all practical purposes, the ability to change power transfer is maintained even in the absence of communications through use of the present invention.

SUMMARY OF INVENTION

It is therefore a primary object of the invention to provide a new and improved HVDC system employing a novel floating current order control subsystem for developing a continuously available floating current order control signal which is representative of the magnitude of the direct current flowing in the HVDC link plus a predetermined current margin whose polarity is dependent upon the direction of power flow, and which is supplied to the regulator of the power converter of the HVDC system which is not in control of current. In the event of a mode switching occurrence, or other similar transient condition requiring transfer of current control from one power converter of the HVDC system to the other, the floating current order control signal is continuously available even though there may be a loss of communications in the communication link between the two power converters. With a floating current order that follows the primary current order within a specified current margin except for brief transient periods when the end where the primary order originates loses current control, current order changes may be allowed without risking unintentional power reversal or excessive power bumps in the event transfer of current control does occur. This can be achieved despite the absence or lack of input from a communications link.

In practicing the invention, an HVDC electric power delivery system is provided which includes power converter means comprised by a plurality of controllable electric valves connected between alternating current and direct current electric power conductors together with means for cyclically firing the valves in a predetermined sequence and at firing angles measured with respect to the alternating voltage which can be varied to control the flow of power between the alternating current and direct current power conductors. The power converter means also include regulator means for comparing a plurality of input control signals which respectively represent different predetermined operating characteristics of the HVDC system during operation and for deriving a controlling output error control signal that controls the firing angles of the valves. A floating current order control subsystem is coupled to the regulator means for supplying thereto as one of the input control signals a floating current order control signal representative of the magnitude of the direct current flowing in the direct current power conductor plus a predetermined current margin whose polarity is positive when the power flow in the system is in one direction and is negative when said power flow is in the opposite direction. The floating current order control subsystem is comprised by a current sensor coupled to the direct current electric power conductor for deriving a measured line current feedback signal representative of the actual measured value of the magnitude of the direct current flowing in the direct current power conductor and summing circuit means for combining the measured line current signal with a predetermined fixed signal whose magnitude and polarity is representative of a desired current margin and for deriving the output floating current order control signal.

The floating current order control subsystem further includes rate limiting means for limiting the rate of change of the floating current order control signal to some predetermined rate of change value either in an increasing or decreasing magnitude value direction. In addition, maximum and minimum boundary setting means are provided for setting maximum and minimum magnitude values to which the floating current order control signal is allowed to change corresponding to predetermined maximum and minimum values of load current magnitude which the power delivery system is allowed to deliver. A DC voltage interruption detector and current "ramp-down" means also is provided which is coupled to the direct current electric power conductors for detecting interruption of the DC voltage and deriving a DC voltage interruption control signal for overriding the current order or other operating mode control signal in the control of the regulator and "ramping-down" the magnitude value of the DC current to a predetermined low level. If desired, a high α or β angle detector can be used in place of, or in addition to the DC voltage loss detector.

The floating current order control subsystem may comprise either an analog system or a digitally operated system. A digitally operated subsystem also is provided and includes a digitally operated up-down counter and a digital-analog converter with the up-down counter being connected so that its output is supplied through the digital-analog converter to control the regulator means of the power converter. Summing circuit means are provided which have a feedback signal representative of the magnitude of the direct current supplied thereto together with a predetermined current margin to be described hereinafter and derives an output floating current order signal that is applied as an enabling input to one terminal of the up-down counter. A source of digital clock signals is connected to a clock signal input terminal of the up-down counter for causing the up-down counter to count up or down an amount depending upon the polarity and magnitude of the floating current order signal supplied to it as an enabling potential. Polarity sensitive gate means are connected between the summing circuit and the enabling input terminal of the up-down counter to cause the up-down counter to count either up or down depending upon the polarity of the error signal determined by the difference between the floating current order control signal and the measured response plus or minus the current margin. Means are provided for adjusting the frequency of the digital clock signals supplied to the clock signal input terminal of the up-down counter to thereby control the rate of change of the floating current order control signal derived through the output of the digital to analog converter. The count set in the up-down counter can be stored in the manner of a memory should transfer of current control be required by discontinuing changes in the count stored in the counter after transfer of current control.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 2 is a detailed schematic circuit diagram showing the details of construction of an HVDC power converter having a floating current order control subsystem constructed in accordance with the invention for use in the HVDC power delivery system shown in FIG. 1;

FIG. 3 shows a series of voltage and current vs. time wave shapes illustrating the manner of operation of the floating current order control subsystem shown in FIG. 2;

FIGS. 4A, 4B, and 4C illustrate a number of different control voltage versus current operating characteristic curves for the system of FIG. 2 for rated and minimum power conditions with fixed AC system voltage and for minimum power condition with lower AC system voltage;

DETAILED DESCRIPTION OF PREFERRED EMBODIMENTS

Figure 1:
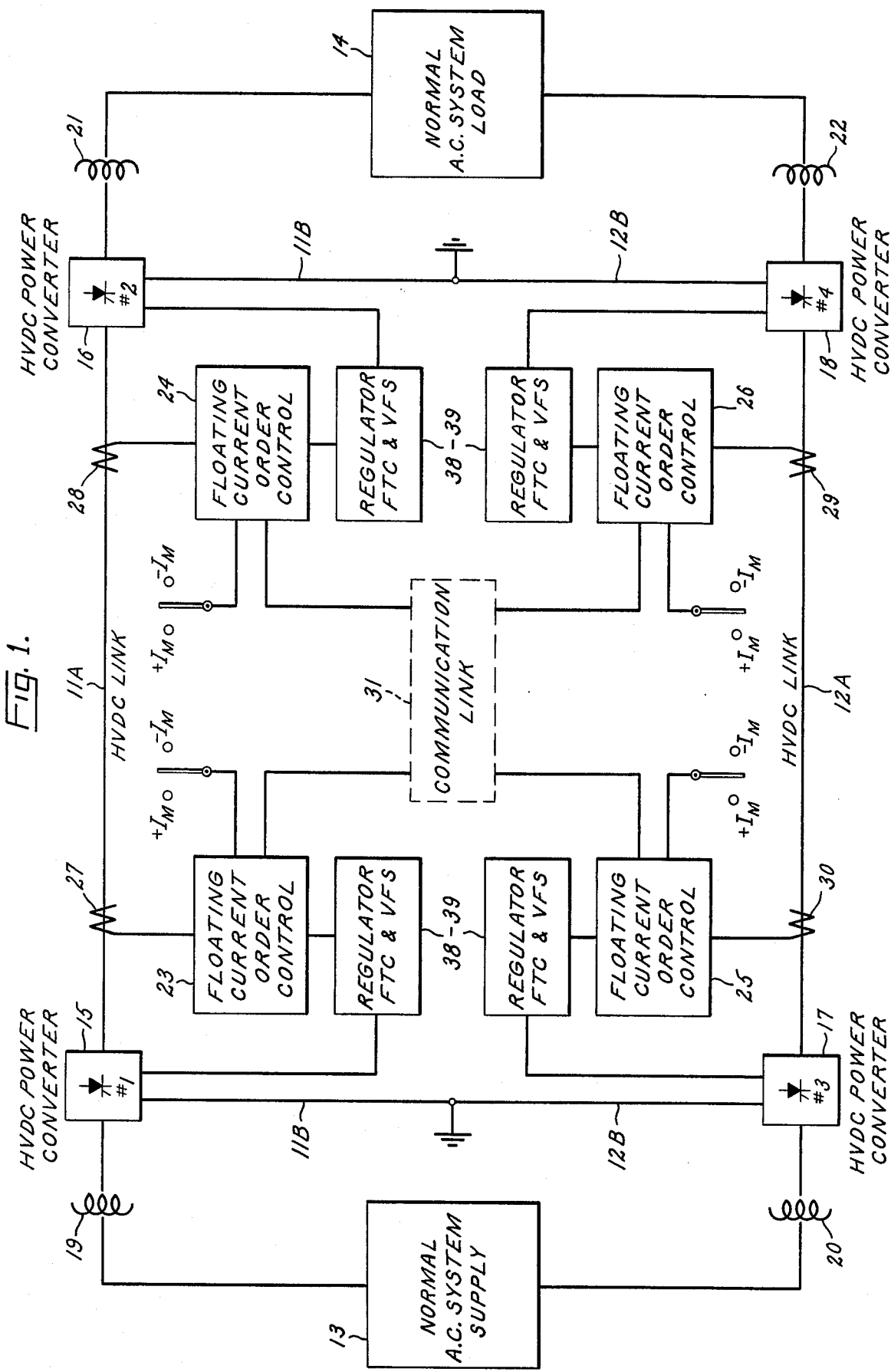
FIG. 1 is a functional block diagram showing the essential elements of an HVDC power delivery system constructed in accordance with the invention.

FIG. 1 is a functional block diagram of an overall bi-polar HVDC power delivery system comprising conductor links shown at 11 and 12, respectively, for supplying high voltage direct current electric power from what is normally a source of alternating current electric energy indicated at 13 and which may comprise a remote located mine mouth fossil fuel fired electric power generating station, a hydro electric station, a remote located nuclear power station or any other source of alternating current power. The HVDC link transfers the electric power thus derived to what is normally an alternating current system load 14, such as the alternating current distribution center of an industrial plant, municipality, or the like. The HVDC links 11 and 12 each comprise high voltage direct current power transmission line conductors for conducting high voltage direct current electric power between respective HVDC power converters 15, 16 and 17, 18. For the purpose of this description, it will be assumed that the HVDC power converters 15 and 17 will be operated in a rectifier mode for rectifying alternating current electric energy supplied from the supply source 13 through the respective supply transformers 19 and 20, to thereby convert the alternating current power to high voltage direct current electric power for supply through the high voltage direct current power conductors 11A and 12A. The HVDC power converters 16 and 18 then would be operated in the inverter mode for converting the high voltage direct current power to alternating current power that is supplied through the supply transformers 21 and 22 respectively to the AC system load 14. With such an installation, the terminals comprised by the HVDC power converters 15 or 17 would be designated as the primary terminal or the one expected to be operated most frequently to control current flowing through the HVDC transmission system and the system is described as operating in "A" type of current control. If the roles of the two sets of power converters are reversed so that 16 and/or 18 are operated to control current while still functioning as inverters, this is designated as "B" type of control of current in the HVDC system. Under some conditions it may be advantageous to operate the HVDC system in "B" type current control. While a two-terminal bi-polar HVDC transmission system has been described and shown in FIG. 1, its use is exemplary only for the invention can be used with equal facility in monopolar or multi-terminal systems.

In order to accomodate the above discussed requirements, each of the HVDC power converters 15 through 18 is provided with a respective floating current order control subsystem 23, 24, 25, and 26, and all are substantially identical in construction and operation as will be described more fully hereinafter. However, it is to be understood that, if desired, only certain ones of the power converters of the system may be provided with floating current order control subsystems such that the floating orders are available at only one end of the HVDC link. Each of the floating current order control subsystems 23–26 has supplied thereto as an important input controlling parameter, a feedback signal representative of the sensed actual value of the magnitude of the direct current flowing in the direct current electric power conductors 11 and 12, respectively. These feedback signals are derived by the direct current sensors 27, 28, 29, and 30. In addition, each of the floating current order control subsystems 23–26 is provided with either a positive polarity or negative polarity current margin signal $\pm I_M$ dependent upon the direction of power flow as will be explained more fully hereafter. Finally, a communication channel through a communication system indicated at 31 is provided whereby the current order imposed by an operator of the system at a primary control station (for example, HVDC power converter 15) will be communicated to the opposite HVDC power converter station (assumed to be 16) that is not then in current control.

FIG. 2 is a simplified schematic circuit diagram showing the vconstruction of an HVDC power converter including a regulator, firing time computor and valve firing system together with a floating current order control 24. For the purpose of this description, it will be assumed that the power converter shown in FIG. 2 corresponds to the power converter 16 of the system shown in FIG. 1, although it is to be understood that the floating current order control subsystem 24 as shown in FIG. 2 preferably is employed in conjunction with all of the HVDC power converters used in the HVDC power transmission system. Further, the floating current order control subsystem shown in detail in FIG. 2 will be assumed to be operating to develop and apply to the regulator of the power converter 16 suitable floating current order control signals indicated as $I_{ODF}$ for use by the regulator in the event of an ordered change of current by the power converter 15 in the absence of communication or in the event of loss of current control by the power converter 15 due to a voltage dip in the AC system. While thus operating, the power converter 16 will be serving as the inverter of the HVDC power transmission system and will be functioning to maintain the HVDC line voltage.

As explained more fully in the above referenced U.S. Pat. No. 3,832,620 to Pollard, the power converter 16 shown in FIG. 2 is comprised by a plurality of controllable electric valves $35_1$ through $35_6$ interconnected and arranged to form a three-phase, double way 6 pulse bridge. Although a specific 6 pulse bridge is described, it is exemplary only, for the invention can be used with power converters comprising any number of electric valves connected in a bridge configuration. The AC terminals of the bridge are respectively connected to the primary windings 36P of a three-phase power supply transformer 36 whose secondary windings 36S supply an alternating current system load. The controllable electrical valves $35_1 - 36_6$ preferably comprise large power rated silicon control rectifiers which are sequentially rendered conductive by a valve firing system 38 and are supplied direct current through a choke reactor 37 from the HVDC power conductors 11A and 11B. The controllable valves $35_1 - 36_6$ are sequentially fired by the valve firing system 38 under the control of a firing time computor 39 whose operation in turn is controlled from the output of a regulator 80. During operation of the power converter, the magnitude of the HVDC current flowing in the HVDC power conductor 11A and 11B is sensed by the sensing coil 28, and the magnitude of the direct current voltage across the conductors is measured by a suitable DC line voltage monitor 41. For a more detailed description of the construction and operation of the controllable rectifier bridge comprising power converter 16, the firing time computer 39, valve firing system 38 and the regulator 80, reference is made to the above noted U.S. Pat. No. 3,832,620 and the Prior Art Publications referenced therein, and to the textbook entitled *Direct Current Transmission*, Volume I; Edward W. Kimbark, author; published by Wiley Interscience, a Division of John Wiley & Sons, Inc. — New York, N.Y.

Regulator 80 in fact comprises some six different closed loop regulators which provide feedback control during the operation of the HVDC power converter to cause it to operate in any one of the following six different modes:

1. Rectifier firing angle control ($\alpha$ mode)
2. Current control (I mode)
3. Rectifier voltage control ($V_R$ mode)
4. Inverter voltage control ($V_I$ mode)
5. Margin angle control ($\gamma$ mode)
6. Inverter firing angle control ($\beta$ mode)

During operation each of the above listed closed loop regulators consists of its own characteristic regulator function including in a closed loop, the firing time computer, the valve firing system, the HVDC converter, the valve monitors, the DC sensors, etc. However, it is the particular closed loop regulator that then is in control of operation of the HVDC converter which causes it to operate at a desired operating point in a manner characteristic of that particular mode of operation.

In addition to the above listed closed loop regulator circuits, the regulator 80 further includes a regulator mode selector and the mode of regulation detection circuitry which provide the following functions:

a. Automatic selection of proper mode of regulation through error signal comparison;

b. Detection of mode of regulation;

c. Combining the reference, bias and response signals for each mode of regulation;

d. Provides separate gains and frequency dependent transfer functions for each mode of regulation;

e. Automatic bias;

f. Generation of a low impedance regulating output signal $R_O$ proportional to the error of the active mode of regulation; and g. Anticipator control for margin angle ($\gamma$) mode of regulation.

The regulator 80 comprises a feedback controller which is similar in operation for all modes of regulation. Each mode of regulation has separate gain characteristics, trimmed to give desired response characteristics for that particular mode of regulation. The regulator 80 in any mode essentially compares the system response with a reference value, and any difference results in the development of an error signal. This error signal is used to give a proportional change in the frequency of the voltage controlled oscillator comprising a part of the firing time computer 39 as explained in the above-referenced Pollard U.S. Pat. No. 3,832,620. The change in frequency of the voltage controlled oscillator causes the firing angle ($\beta$) or ($\alpha$) of the power converter to be adjusted such that the error signal then is reduced. In the steady state, the error signal ideally is reduced to zero.

The orders for the three firing angle modes of regulation ($\beta$, $\alpha$, and $\gamma$) are generated locally and need not be considered for purposes of the present description. The two voltage control modes of regulation ($V_R$ and $V_I$) are important to note only in that generally speaking, under ideal conditions, the power converter not normally in control of current during system operation would be expected to be the power converter functioning as the inverter of the system and would be operating in the $V_I$ voltage regulating mode. The significant orders to be considered are the current orders which may be generated in the following manner:

1. System Current Order (primary current order) — The system current order is obtained from the order for power or current placed on the HVDC power transmission system at the terminal designated as primary. The primary terminal is that terminal expected to be operated most frequently in the current control mode, and probably the one most frequently operated as the rectifier. The system current order under normal operating conditions will be changed only at selected rates, the fastest of which typically may be one per unit in 30 seconds. This means that if the HVDC power transmission system is rated, for example, at 500 megawatts, 500 kilovolts at 1000 amperes, then the one per unit change in 30 seconds fastest rate of change allowable by the system would allow the current to change one unit of rating in 30 seconds or 1000 amperes in 30 seconds. The system current order normally is transmitted to the secondary terminal such as 16 in the system of FIG. 1, by way of a communications link shown at 42 in FIG. 2. Normally, the control is such that if the communications link is interrupted, the order on the power converter not in control of current (the secondary terminal) remains at the last communicated value. With such an arrangement a danger exists that the maintenance of the secondary terminal at the last communicated order, following a break in the communications link, may lead to an unwanted power reversal if the current order at the primary terminal is decreased during the interval while communications remain broken.

2. Manual Current Order — It is customary in most systems to provide backup manual current orders which are generated locally for use in case of failure of the current order computer located at the primary terminal or in case of failure of the communications link at the secondary terminal. In addition a current order computer may be provided at the secondary terminal, if desired, so that the terminal in question can assume primary control in certain conditions. In switching to backup manual current orders, it is desirable to provide nearby "bumpless" transfer. This has been accomplished by inhibiting the transfer unless the order and response are first adjusted to agree within a predetermined percentage. Another approach is to provide an automatic system such that the manual order is always kept equal to the response while in automatic control so that it is ready for nearly "bumpless" transfer at any instant. This avoids delay but is usable only for transfer in one direction (to manual control). Another approach is to make the transfer ahead of a rate limited additional amplifier, but this also involves delay.

3. Floating Current Order — At whichever terminal of the HVDC power transmission system that is not in current control at a particular time, a backup floating current order is developed which deviates from the existing current response of that terminal by a predetermined current margin, for example, 0.1 per unit. The polarity of the current margin would be determined by the direction of power flow. In type A control of current, the polarity is negative and is applied to the inverter. In type B control of current, the polarity is positive and is applied to the rectifier. In normal conditions the current response at each terminal is the same and, with one terminal assumed to be in control of current, the response is assumed equal to the order in steady-state conditions. Thus, the current, ordered at the terminal that is not controlling current is, in effect, made to deviate from the primary current order by the amount of the current margin, but without immediate dependence on a communications link.

In order to perform its designed function, the backup floating current order must be able to change at least as fast as the fastest normal rate of change in current order placed on the system at the primary terminal, but not as fast as changes in current response which result from disturbances. Thus, the floating current order can be provided by a floating current order computer located at the secondary terminal which can respond only as fast as the fastest ordered rate of change of the primary current order. This will be known for a particular system, and typically may be one per unit in 30 seconds. The floating current order computer is shown at 24 in FIG. 2 and includes both rate of change of current order limiting circuitry and absolute value current order limits or bounds which typically limit the orders between the values of about 0.1 per unit to 1.15 per unit. By this means, the floating current order computer is allowed to "float" above (B type current control) or below (A type current control) the current response of the system and follow normal rates of changes, but transient current changes which usually are much faster will not be followed. When ordered current magnitude is as great as the current limits established by the current limits or bounds, then the floating current order computer will serve to limit the current magnitude in the HVDC system to no greater value than that established by the bounds.

As best shown in FIG. 2, the floating current order computer 24 is comprised by a first summing amplifier 51 which is conventional, commercially available, integrated circuit feedback operational amplifier having its input connected to serve as a summing circuit for receiving a feedback signal $-I_D$ supplied thereto over a feedback conductor 52 from the current sensor 28. A suitable amplifying and filtering circuit 50 is connected in the feedback conductor 52 for filtering out characteristic harmonics appearing on the line. The direct current feedback signal $-I_D$ is supplied to one of the summing input terminals of the summing amplifier 51 through a selector circuit 53 comprised by a set of normally closed relay contacts but which also could comprise a suitable solid state switching arrangement whereby the input to the summing amplifier 51 can be changed from the feedback signal $-I_D$ to either a remote current order signal or to a locally generated current order signal as determined by the setting of an operator's switch 54. The purpose of this arrangement will be described more fully hereinafter.

In addition to the HVDC current magnitude feedback signal $-I_D$, the summing amplifier 51 has supplied thereto a current margin signal $\pm I_M$ and operates to sum together the two input signals $-I_D$ and $\pm I_M$ and to derive at its output a signal representative of the combined value of the two input signals. The current margin signal represents the difference between the current order placed on the converter at the terminal normally expected to control current and the desired current order for the other converter of the system and its polarity depends upon power direction. In type A control, the polarity of the current margin is negative and is applied to the inverter. In type B control, the polarity is positive and is applied to the rectifier. For example, as shown in FIG. 4A with the HVDC system operating in B type current control, the system operating point is at A and the current margin $I_M$ is applied to the rectifier and equals + 0.1 parts/unit. The current margin $\pm I_M$ may be derived by a potentiometer or other suitable signal source under the control of an operator of the system.

The combined signal $(-I_D \pm I_M)$ is supplied through an inverting amplifier 55 to the input of a ramp generating amplifier 56. The inverting amplifier 55 and ramp generating amplifier 56 both are similar in construction to the summing amplifier 51 but have their input and feedback output terminals interconnected through appropriate respective resistors and feedback capacitors to serve respectively as an inverting amplifier and a ramp generator. The ramp generator 56 develops either an increasing or decreasing ramped signal voltage at a rate related to the maximum rate of change of current allowed for the system (for example, 1 per unit in 30 seconds), and provides at its output terminal a floating current order signal $+I_{ODF}$ which is rate of change limited due to the ramp function introduced by the ramp generator 56. Thus, the floating current order signal $I_{ODF}$ will reflect relatively long term changes in magnitude of the HVDC current flowing in the power conductors 11A and 11B but will be prevented from following faster transient changes in current due to faults and the like occuring in the system. The $+_{ODF}$ floating current order signal derived at the output of ramp generator 56 is supplied back over a feedback conductor 57 and input register 58 to the input of summing amplifier 51 in a closed loop regulating subsystem to stabilize operation of the closed loop subsystem comprised by elements 51, 55, and 56. This feedback signal also is applied to a suitable display shown at 59 for indicating to an operator at the secondary terminal the value of the floating current order $I_{ODF}$ at any given time. The magnitude of the HVDC current flowing in power conductors 11A and 11B and reflected in the feedback signal $-I_D$ also is indicated on a suitable display 61.

The floating current order computer 24 also includes high and low boundary limit setting circuit means comprised by a low boundary limit setting potentiometer including resistors 62 and 63 connected between the output of ramp generator amplifier 56 and a source of positive voltage. The junction of resistors 62, 63 is connected to the base electrode of an NPN clamping transistor 64 whose emitter is connected to the summing input terminal of summing amplifier 51 and whose collector is connected to a source of negative voltage. A high boundary limit setting network comprised of a set of potemtiometer resistors 65 and 66 is connected between the output terminal of the ramp generator amplifier 56 and a source of negative voltage. The juncture of resistors 65 and 66 is connected back to the base electrode of a clamping NPN transistor 67 whose emitter electrode is connected to the summing input terminal of summing amplifier 51 and whose collector is connected to a source of positive potential. By this arrangement, if the absolute value of the magnitude of the floating current order signal $I_{ODF}$ tries to exceed either the high or low boundary limit value set by potentiometers 65, 66 or 62, 63 either of the clamping transistors 67 or 64 will be rendered conductive and will clamp the input of the summing amplifier 51 to either the high boundary or low boundary magnitude limit values thereby preventing corresponding further changes in the magnitude of the direct current flowing in the HVDC power conductors 11A and 11B.

The floating current order control signal $I_{ODF}$ is supplied as one input to a summing amplifier 101 comprising a part of regulator 80 and which also has the sensed actual value of DC current feedback signal $I_D$ applied thereto in conjunction with the floating current order control signal $I_{ODF}$. Any difference in the two signals is applied as a current regulating input signal in regulator 80. In addition, the second summing amplifier 101 has a third input $-I_{ST}$ applied thereto from a stop signal generator comprised by an NPN transistor 72 having its emitter connected to a negative voltage source and its collector connected to the summing input terminal of summing amplifier 101. Finally, the summing amplifier 101 has a fourth input $-I_{SB}$ from a voltage interruption ramp down subcircuit to be described hereinafter.

During normal operation of the HVDC power transmission system, neither the stop power converter signal $-I_{ST}$ nor the voltage loss ramp down signal $-I_{SB}$ will be present (i.e. their value is essentially 0) so that summing amplifier 101 will see at its input only the floating current order control signal $+I_{ODF}$ and the sensed actual value of DC current feedback signal $-I_D$. Summing amplifier 101 sums these two signals together and derives an output error control signal which is applied in regulator 80 as an input current control regulating signal for achieving nearly "bumpless" control of current flowing in the HVDC system in the event that the power converter 16 has to take over control of current in the HVDC power transmission system. This is achieved even in the absence of communication with the primary terminal. The error control signal appearing at the output of summing amplifier 101 in effect represents a ramped, rate of change limited margin correcting signal for causing the power converter not in current control to assume DC line current control at a predetermined marginal amount above or below the existing line current at the instant that the secondary terminal 16 takes over control of current.

AT the rectifier terminal (assumed to be power converter 15 in the above description), when it is not in control of current, the floating current order $I_{ODF}$ would be computed to be greater than the existing response $I_D$ by the amount of the current margin $I_M$. This would correspond to class B type of control as discussed above, and may be regarded as not the normal mode of operation for the HVDC transmission system of FIG. 1. The system normally would operate in the class A type of current control with the control of current at the rectifier end of the system. In this case, with the inverter not in current control, its floating current order $I_{ODF}$ would be computed to be less than the existing response $I_D$ by the amount of the current margin. A further difference in the rectifier versus inverter type current control exists in the current order limits as set by the low and high boundary limit setting circuits. It is important that different upper and lower limits be in effect at the rectifier and the inverter terminals in order that the current margin will remain the same in polarity when the limits are in effect.

When a floating current order control subsystem is included in an HVDC transmission system as shown in FIGS. 1 and 2, unwanted power reversals cannot occur. With communicated orders only, such unwanted power reversals could result from situations in which the current order is being decreased in type A control or increased in type B control at the converter normally in current control and communication unexpectedly is lost. As a result, the current orders at the converter not normally controlling current will not be changed. Eventually, for example in type B control, the current ordered from the inverter becomes greater than the current ordered from the rectifier at which time unintentional power reversal will occur. This could be avoided by inhibiting current order changes in the absence of communication, but such a restriction on system operation would not be necessary with systems including a floating current order control subsystem.

Normally, changes in operating mode or other conditions requiring the floating current order to limit current in the system are of short duration and can be terminated by clearing of a fault, termination of a by-pass, operation of tap changers, or VAR control, or other forms of AC voltage control. In such cases there would be no dependence upon communication between the primary and secondary terminals. However, if a continuing reduction of voltage occurs, which cannot be compensated readily by any of the AC voltage control means available, and remains in effect for more than a few seconds, then the floating current order may in fact "float" or "drift", ultimately reaching the high current limit in a rectifier or the low current limit in an inverter. To avoid such situations, it is desirable to switch automatically to non-floating current orders is the local terminal (not normally in control of current for the HVDC system) remains in current control for a time period of the order of more than one second. To signal the need for such a switch to non-floating current orders, the regulator 80 includes a regulator mode detection circuit, to be described hereinafter with relation to FIG. 6, for deveoping a regulation mode detection signal. This signal is supplied over a conductor 75 in FIG. 2 and delay circuit 76 for providing a delay of the order of one second, to excite the solenoid winding 77 of a selector switch 53. While selector switch 53 has been indicated to be relay-actuated selector switch, it is believed obvious that a solid state switching circuit could be employed in its stead. Upon acutation of the solenoid winding 77, the normally closed contacts of selector switch 53 will be opened, and the normally opened contacts will be closed to switch the terminal over from floating current order control to either local order or remote order if the communication link 42 is in operation dependent of course upon the setting of the operator's selector switch 54 by an operator of the terminal.

The local non-floating current orders may be the communicated orders from the other terminal of the system in which case there is a dependence on communication between the two terminals of the HVDC system. However, the only consequence of communication loss is the loss of the ability to change the orders. The risk of operating in this condition may be considered acceptable since it is not considered normal and presumably will be corrected by switching back to the original mode of operation. It is also possible that the local non-floating current orders be generated locally in which case the local terminal assumes primary control over current in the HVDC power transmission system. In such a situation, there will be no dependence on the communication link because the conditions which caused the local terminal to switch to non-floating current order will have caused the other terminal to switch to floating current order since both terminals have floating current order control subsystems as explained earlier with relation to FIG. 1. Thus, there is no danger of unwanted power reversal as long as one of the floating current order control subsystems remains in effect at one terminal or the other.

It will be appreciated from FIG. 2 that since switching from floating current order to local non-floating current order is done at the input of the rate limited current order computer subsystem comprised by elements 51, 55, and 56, system "bumps" in the form of drastic changes in current magnitude greater than the current margin, are avoided, and some time leeway is provided so that the switching need not be synchronous at the two ends of the system as long as the magnitude of the current margin $I_M$ is sufficient to absorb momentary minor differences.

FIG. 3 of the drawings illustrates the effect of type of current control switching on current response in the HVDC power transmission system as influenced by the current order limits imposed by the transistors 64 and 67 and the floating current order control computer 24. At FIG. 3(*a*) the inverter end initially was in control (B type) with the current at the low limit of 0.1 per unit. Upon the occurance of the inverter AC voltage drop as shown by the upper rectified inverter AC voltage wave shape, it was no longer possible to maintain control at the inverter end, and the current became limited by the rectifier low limit of 0.2 per unit even though the communicated orders may remain at the 0.1 level. Thus, the lowest level of power transmission can be obtained only with the B type of current control. When the power being transmitted by the system is at some intermediate level such as shown at FIG. 3(*c*), the response remains equal to the primary order in both the A and B type of operation except for a transient period of about 4 seconds (for example) following each transition from one type of current control to the other. The full overload power of which the transmission system is capable can be obtained only in type A as shown at FIG. 3 (*e*) because of the need for maintaining the current margin. Therefore, it will be appreciated that a change of power can be accomplished by switching from one type of current control to the other. Possibly a compromise can be made in the conditions illustrated at FIG. 3 (a) and FIG. 3 (e) such that the full current margin is not maintained in these conditions and there is less of a difference between types of operation. Such intermediate conditions of operation are illustrated at FIG. 3 (b) and FIG. 3 (d) which show that where the limits are only partially in effect, the change in power level between types of current control is reduced.

Prior to describing the operation of the HVDC power transmission system utilizing floating current order control and its various modes of operation, it will first be necessary to consider the effect of a DC line voltage interruption in the form of a substantial dip or loss at either the rectifier or inverter end of the system. Without communication the reason for a severe dip or loss of DC line voltage sensed at either terminal will not be known. However, it is desirable that control action be taken which is appropriate for all situations. The cause of the severe DC line voltage dip or loss may be a line fault or cable fault or a bypass which may or may not be the start of a shut-down or it may be a commutation failure. In any event, it is desireable that the control at both terminals be overridden and the current order be ramped down to some low fixed level typically 0.3 per unit. At the inverter end only, because of other considerations to be discussed more fully hereinafter, the ramp-down may be delayed as much as a cycle or two at the 60 hertz AC system voltage in comparison to the rectifier end where the start of the ramp-down is immediate as soon as the severe voltage dip or loss is detected.

The voltage interruption detection and ramp-down circuitry is shown in FIG. 2 and includes as a part thereof the DC line voltage monitor 41 which continuously monitors the DC line voltage value and supplies a feedback signal $V_D$ over a feedback conductor 81. If desired, instead of the DC voltage monitor a high value of $\alpha$ or $\beta$ detector such as shown in dotted lines at 71 could be used either in place of or in addition to the voltage monitor 41. The DC line voltage feedback signal $V_D$ is applied as one input to a summing amplifier 82 having a reference value of line voltage $V_R$ of the order of 0.3 parts per unit applied to a remaining input thereof for comparison to the measured actual value $V_D$ of the DC line voltage. The output from comparator amplifier 82 is supplied directly to the base electrode of a PNP transistor 83, in the case of the terminal which most often is operated as the rectifier. At the terminal where the power converter is operated most often as an inverter, a delay 84 of about two cycles at the operating frequency of the system is interposed between the output of the comparator amplifier 82 and the base of PNP transistor 83. The emitter of transistor 83 is grounded and its collector is connected between a source of negative voltage $-V$ and the summing input terminal of a summing amplifier 91. Summing amplifier 91, inverter amplifier 95 and ramp generator 96 all are similar in construction and operation to the summing amplifier 51, inverter 55 and ramp generator 56 with the notable exception that the ramp generator 96 can only ramp-down in a negative going direction at a rate of about 1 per unit in 1/10 of a second. The summing amplifier 91 has an additional reference input $-I_{OS}$ representative of the median value of the line current together with the floating current order control signal $+I_{ODF}$ appearing at the output of ramp generator 56 and a feedback signal $(I_{OS} - I_{ODF})$ appearing at the output of the ramp generator 96.

For so long as the line voltage maintains the feedback signal $-V_D$ at a value greater than $+V_R$, transistor 83 is maintained conducting and will clamp the junction of resistors 85 and 86 to ground potential. Under these conditions, the summing amplifier 91 through summation of the $+I_{ODF}$, $-I_{OS}$ and the $(I_{OS} - I_{ODF})$ signals together with inverter 95 and ramp generator 96 provide at the output of ramp generator 96 an essentially zero value signal represented as $-I_{SB}$ for application as one of the inputs to the output summing amplifier 71. Thus, under normal operating conditions the voltage interruption ramp-down circuitry comprised by elements 91, 95, 96, etc. will have no effect on the operation of the circuit. However, in the event of an interruption in the form of a severe voltage dip or loss of DC line voltage whereby the magnitude of the feedback signal $-V_D$ becomes less than $V_R$, transistor 83 will be turned off. Upon this occurrance, a negative going potential is supplied from the source $-V$ across voltage dividing resistors 85 and 86 to the input of summing amplifier 91. This causes the output of ramp generator 96 to start increasing in the negative direction the value of $-I_{SB}$. As stated earlier, the output $-I_{SB}$ of ramp generator 96 is adjusted to ramp-down the value of the current supplied by the system at a rate of 1 per unit in 1/10 of a second and remains in effect until such time that the fault is cleared and the DC line voltage is restored to some value greater than 0.3 per unit, for example 0.65 per unit.

Having described the construction of a preferred embodiment of a new and improved HVDC power transmission system including a floating current order control subsystem, the operation of the system under various different conditions will now be described.

To start the system in a normal way the current order is placed at a low value typically 0.1 per unit but the response will be zero before starting. Therefore, neither terminal will be in current control and both floating current orders are in effect but are restricted by the low current limits. At the rectifier end, the response plus margin would give +0.1 net order, but this is limited to +0.2 by the low current boundary limit. At the inverter end, the response minus the margin would give −0.1, but this is limited to +0.1 by the low current boundary limit. To standardize the starting procedure for initiating current in the DC transmission line comprised by power conductors 11A, 11B, (which procedure also can be used for adding additional converter units to a running line), one terminal is started into a bypass switch closed at the opposite end of the line. The sensing of current at the opposite end of the line, with time allowed for stabilization of control, initiates the opening of the bypass switch at that end and the starting of the opposite end converter unit as a rectifier to extinguish current in the bypass switch. Since the second terminal to start must be capable of greater current than the first, it is desirable that the inverter end be started first. Actually, however, the normal current overshoot when starting will probably allow either end to start first. Once both ends are started the DC line voltage rises naturally as fast as the regulators and the characteristics of the HVDC link will allow or can be slowed down by the voltage control mode regulating loop at the terminal in control of voltage for the system.

The normal control mode or normal running mode is designed for current control at one end and DC line voltage control at the other end of the transmission system in order to best prevent disturbances in one AC system from being felt in the other AC system through the DC link. For best efficiency under all conditions, it is desireable to have a secondary control at both ends in order to adjust the AC voltage fo the respective AC supply system and AC load system by such means as tap changers, static VAR control, synchronous condensers, or capacitor switching, for example. At the rectifier end, whether the HVDC system is operating in either the A or B mode, this secondary AC system control would operate to keep the measured firing angle $\alpha$ within a narrow band such as 15.5°–21.5°. Likewise at the inverter end a secondary AC system control would operate to keep the margin angle $\gamma$ within a desired band. In this case the margin angle could either be obtained by direct measurement or, in a stiff system, by measuring the firing angle and compounding in proportion to the overlap angle which is a function of the firing angle and the DC circuit and commutating reactance.

FIG. 4 shows the control characteristics for the system with uncompounded voltage orders for three sistuations represented by a fixed AC system voltage at rated power, fixed AC system voltage at minimum power and minimum power with lower AC voltage. With fixed AC system voltage at rated power as shown in FIG. 4A relatively high AC voltages are required at both terminals to achieve the desired firing angles at full load. If the load is then reduced as shown in FIG. 4B without changing the AC system voltages, the firing angles at both ends would become larger than necessary with a consequent greater than necessary VAR consumption and reduced efficiency. Efficiency can be improved by lowering the AC system voltage as shown in FIG. 4C.

The effect of voltage dips depends on the amount of current margin allowed and on the speed of the response of the secondary AC system controls as discussed above. With no secondary AC system control, as indicated in FIG. 4B, there would be a relatively wide margin for dips at light load but not at full load. The ideal system is one which provides fast secondary AC system control such as static VAR control which can keep the desired primary AC system voltage for any given DC load current and thus VAR demand. With slow secondary AC system control, as exemplified by tap changers, large rectifier voltage dip could cause the backup minimum firing angle control ($\alpha$ mode) to take over from current control with a consequent drop in DC line voltage and current and thus in power transmission. Such events could tend to shock excite the natural resonance between the DC line capacitance and smoothing reactor inductance and even the AC system reactance. Strong current control at the inverter end due to the takeover by the floating current order control subsystem will tend to prevent oscillations at that end, however, there will be a tendency for oscillations at the rectifier end to continue until either the current mode or voltage mode of control is restored.

In the case of inverter voltage dips, a fast secondary control loop for the AC system at the inverter end will help to keep the control mode then in effect by compensating for loss of voltage. If the secondary control loop is unable to do so, the backup margin angle control ($\beta$ mode) must take over with consequent loss of DC line voltage and an increase of DC line current resulting from a shift in the mode of control. This increase of current is a disadvantage in one respect in that it increases the tendency for commutation failure. However, with a normal full load overlap angle of 20°, the 10% increase in current amounts to only about 2° of margin angle loss. This loss enhances the possibility of commutation failure. To compensate for this disadvantage, the increase of current in the presence of a voltage decrease helps to maintain the power being transferred to a more nearly constant level. The DC line resonance will be shock excited to some extent by the loss of voltage and current increase, but strong current control at the rectifier end will tend to resist buildup of oscillations and provide some damping. A tendency for inverter end oscillation will persist until either the current mode or voltage mode is restored, which fact further emphasizes the need for a fast secondary control such as a static VAR control for the AC system at the inverter end of the transmission line.

At the rectifier end of the transmission system, the immediate consequences of a DC line voltage loss is an upward surge of current due to the sudden loss of counter EMF and the limited ability of the regulator to respond rapidly enough to hold the current at the order then in effect. Feedforward techniques to force the rectifier firing angle toward maximum alpha when a loss of voltage is sensed may help to lower this reaction, but an inherent limit on the rate at which the firing angle $\alpha$ may be advanced may make it ineffective. In any case, if the system was operating in B type current control, the rectifier end floating current control becomes effective in trying to hold the current. However, it is appropriate in all cases for the floating current order to be overriden by the voltage interruption rampdown so that the current orders to the regulators of both the rectifier and the inverter quickly can be brought down to a lower fixed level perhaps somewhat higher than the low current order limit, typically 0.3 per unit for the rectifier. This action will be taken irrespective of the cause of the DC line voltage loss.

The reasons for reducing the DC line current in the event of a DC line voltage loss are that if the voltage loss resulted from a temporary valve bypass at the opposite end, the reduction of current reduces the heating load on the controllable electric valves involved in the electronic thyristor valve bypass since they will be experiencing three times normal current duty. Also it reduces the VAR loading at the end which continues to hold current. If the bypass is the start of a normal shutdown, the reduction in current will assist in the process and no further reduction may be required. However, if it is the beginning of an emergency shutdown, the current reduction brings the system closer to zero current so that less of a change is required when the shutdown is completed. If the voltage loss resulted from a DC line fault, the non-synchronized current reduction at each terminal may provide possible opportunities for fault clearing without complete shutdown.

The DC line voltage loss ramp-down subsystem comprised by elements 91, 95 and 96 in FIG. 2 in effect overrides the floating clamp current order ($I_{ODF}$) and substitutes a fixed low value current order ($-I_{SB}$) but does so in a manner such that the transition is accomplished at a fixed rate of change (ramp rate) of the order of 1 per unit in 0.1 seconds. In the case of the rectifier end, the ramp-down is immediate at the above-noted rate. In the case of the inverter end, a two cycle delay is imposed by the delay element 84 before the rampdown commences. Upon reaching the low current level, the fixed low current order ($-I_{SB}$) remains in effect for a period of time until the DC line voltage recovers upon termination of a bypass or fault clearing, or until a communicated stop order is received, or until a maximum time limit is reached at which a temporary stop or local stop is ordered. If the DC line voltage recovers above a set level (for example 0.65 per unit), then the current order ramps back up to the level determined by the output of the current order computer located at the primary terminal in current control and the output of the voltage loss ramp-down subsystem remains held at zero by the presence of the DC line voltage feedback signal $-V_D$.

In the event that the DC line voltage does not recover and a stop is ordered, this is carried out immediately by adding the signal $-I_{ST}$ to the input of the second summing amplifier 101 through the stop signal transistor 72. Upon the current in the system falling below its lowest allowable limit (typically 0.05 per unit) the local block and bypass circuitry is enabled and bypass switch closure initiated. If orders to run remain in effect after an elapsed recycle time of the bypass switch (assuming no communicated stop orders are received) then the rectifier remains ready to restart automatically in accordance with normal procedure whenever suitable current is sensed in the bypass switch. This will occur if a fault is cleared as a result of the shut-down and the inverter end automatically is started according to established routines.

At the inverter end of the system the immediate consequence of DC line voltage loss differs from that at the rectifier end in that there is a dip in line current due to the loss of voltage that was maintaining the current. Consequently, feed-forward techniques may be very effective in reducing the magnitude of this dip since firing angle ($\beta$) can be advanced rapidly by forcing the output of the inverter to push towards the rectifier region. Without such forcing it is likely that the current will be lost or dip below its low limit resulting in local block and bypass and closure of the bypass switch at the inverter end. Rapid closure of the bypass switch may be important in this situation in case bypass valve pair formation is unsuccessful. In the absence of other influences, this is a temporary stop and automatic restart will occur after the recycle time of the bypass switch or after other delays that are built into the system control. In a DC line fault situation, the rectifier will have continued, independently of the inverter, to feed current through the fault so the restart delay should allow time for full ramp-down of this current at the rectifier. This will establish the possibility that the fault may be cleared by restarting transients at the inverter. If it is not cleared, the time-out period for low voltage will continue until shut-down of both ends which may then clear the fault. If the rectifier end was in temporary electronic thyristor valve bypass at the time of inverter shut-down, it probably would have gone into permanent bypass by the time that the inverter end restarts. In this case the rectifier will also restart provided that the conditions causing the initial bypass have cleared or been removed. If the rectifier was in permanent bypass as a result of an automatic stop, then in the absence of communications, the inverter will still restart into the closed bypass switch at the rectifier end but will restop after the time out period of after a "stop" communication is received from the system order computer or other source. The restart would do no harm even in the presence of trouble at the rectifier end since only the bypass switch would be involved in the restart effort.

In the more normal situation with proper feed-forward control, and particularly if the line current initially was high at the time of the DC line voltage loss, current will be maintained at the inverter end and, similar to the rectifier, it is desirable to ramp-down the current order to a fixed low level. However, to reduce the possibility of having the ramp-down contribute to premature loss of current and to help with fault clearing, the ramp-down at the inverter end is delayed (normally a cycle or two) by the delay element 84 to allow the regulator to possibly regain current control. The ramp-down minimum level is made less than at the rectifier end to further assist with fault clearing (possibly 0.2 per unit at the inverter to correspond to 0.3 per unit at the rectifier). Similar to the rectifier end, the ramp-down lower current level will remain in effect until the DC line voltage recovers, or a communicated "stop" order is received or until a local "stop" order occurs after a predetermined time period.

Figure 5:
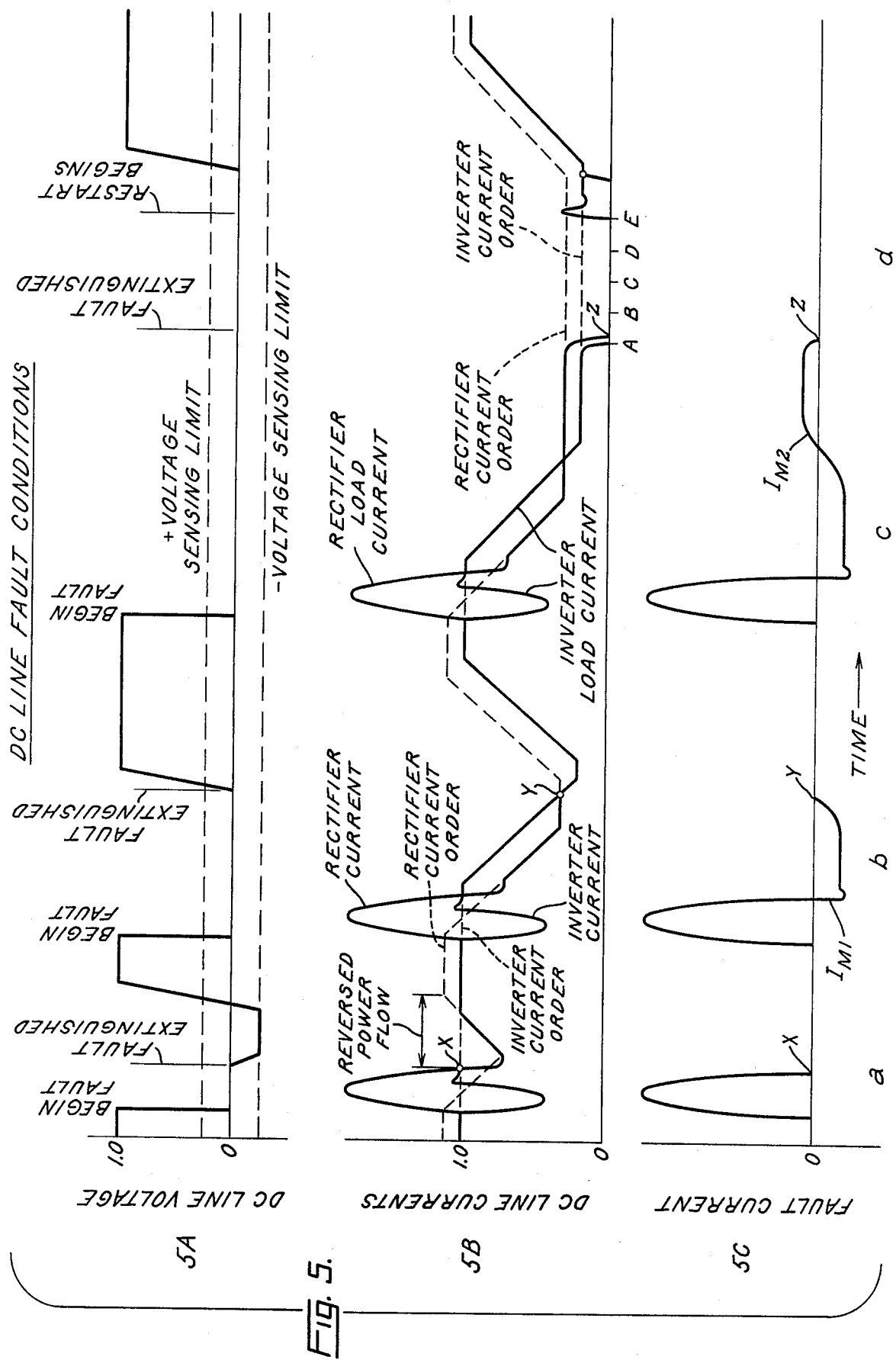
FIGS. 5A, 5B, and 5C illustrate a series of operating characteristics curves showing DC line voltage, DC line current and fault current flowing in the system of FIG. 2 for a number of different assumed operating conditions.

FIGS. 5A–5C indicate some of the possible situations that can arise upon the occurrance of a DC line fault. As shown in FIG. 5C($a$) the initial fault current tends to be high because of the inability of the regulators to respond rapidly enough. In FIG. 5B($a$) it will be seen that the rectifier current orders immediately start to ramp-down but that the inverter orders remain fixed due to the $\simeq 2$ cycle delay. Therefore, as the regulators start to regain control, the rectifier current becomes equal to the inverter current at some point (X) shown in FIG. 5B($a$). At this point the fault current is at least temporarily reduced to 0 and this provides an opportunity for the fault to clear if it is not hindered by deionization time of the fault. However, because of the high magnitude of the fault current immediately preceeding this point, the possiblity of successful clearing is reduced due to the greater deionization time usually required as the result of the high fault current.

If fault clearing does occur, as represented in FIG. 5A($a$), 5B($a$) and 5C($a$), then the rectifier and inverter currents remain equal, but the current order at the original rectifier terminal has now fallen below the order at the original inverter terminal. As a result of this situation, the original rectifier terminal will attempt to begin inverter operation with consequent reversal of power flow. Fortunately, however, the voltage cannot rise rapidly in the negative direction because of the inherent limitation on the rate of retard on the firing angle at the new inverter end. However, the voltage must be allowed to rise to some arbitrary voltage sensing level in order to be able to signal the regulating systems that the fault has cleared. At this point, the current order ramps will reverse themselves and eventually restore the system to its proper operating condition with power flow in the desired direction. It is desirable to limit the degree of negative voltage that is allowed to build up on the line during the ramp-up period at this interval and the voltage control mode is used to assist in this situation. Another approach would be to provide faster ramp-up relative to ramp-down so that the voltage reverses towards its normal level almost as soon as the voltage sensing level is reached.

In the event that clearing of the fault does not occur at the first opportunity, then the fault current reverses as indicated in FIG. 5C($b$) but is limited in magnitude to a margin determined by the ramp-down rate and the delay time on the inverter end. With a steady-state margin of 0.1 per unit, a ramp-down rate of 1 per unit in 100 milliseconds and a delay time of 32 milliseconds, the magnitude of the current would be about 0.2 per unit. The rectifier end reaches its ramp-down level first and the inverter must go to a lower value so that the orders again become equal at some point such as shown at Y in FIGS. 5B(b) and 5C(b). Because of the lower magnitude of the fault current preceeding the point Y there is a somewhat greater probability of clearing the fault at this point than there was at point X. Also this is a preferred point in time for clearing the fault since the voltage will then rise in its normal direction and no power reversal will occur.

If clearing of the fault does not occur at point Y then the fault current will reverse in polarity and in all probability the fault will clear at point Z as shown in FIGS. 5B(c) and 5C(c). Should the fault not be cleared at pont Z, then the ramp-down levels hold for the built in timing periods after which each end shuts down independently. If the rectifier end happens to shut down first, there may be another opportunity for clearing, but it is then too late to catch and hold the current. If the order to supply power is continued at the inverter and nothing causes a permanent stop signal to be ordered, then the inverter automatically will restart after a period such as indicated at A–B–C–D–E in FIG. 5B(d). This allows for recycle time of the bypass switch and deionization of the fault after clearing, whichever is longer. If the fault has cleared, the rectifier end will sense current in its bypass switch and automatically will restart. However, if the line voltage is not restored after a second holding period, the inverter will shut down again and automatically will remove the orders to "run." Ordinarily these "stop" orders will be communicated to the opposite terminal, but no harm will be done if the communication link is lost and the rectifier remains ready to restart.

Much of the procedure for stopping has been covered in the preceeding description where it can be noted that no attempt is made to terminate current in the HVDC line until one end of the system is in bypass. This is desirable in order to avoid the possibility of unwanted power reversal during stopping when a malfunction or absence of communications exists. A planned stop normally would be initiated at the inverter end after the current had been ramped-down to its minimum level of 0.1 per unit. The stop is executed by closure and lock-in of a bypass switch probably preceeded by block and bypass of the valves. In response the rectifier would hold the current for its timing period, or until the "stop" orders were communicated to the rectifier end, and then extinguish the current and close the bypass switch. An emergency stop would employ the same process except it could be initiated in either end at any power level. Also the AC breakers would be tripped after bypass formation. Thus the bypass formation and bypass switch closure method of stopping is applicable to all situations including the removal of converter units from service when multiple converters in series are in use, it requires no communications, and is compatible with other operating conditions previously described.

Emergency power reversal can be accomplished in the floating current order system without the aid of communications by introducing a sudden change of current order so as to bypass the normal ramp functions and exceed the current margin magnitudes. If the reversal is to be initiated at the inverter end, the abrupt current order thus introduced would be increased. If the reversal is to be initiated at the rectifier end, the abrupt current order would be decreased. In the event the reversal of power is initiated at the end of the transmission system in present control of current, the reversal would not be permanent since the floating current order at the other end of the system eventually would catch up. To make the reversal in power permanent, it is necessary also automatically to relate the polarity of the current margin to the polarity of the DC line voltage. Then if the introduced change was twice the magnitude of the current margin, the floating current order would remain fixed during the reversal as the margin changed polarity. In such a case the DC line current must increase during the reversal, but subsequently can be reduced to the desired level if done at a rate slow enough for the floating current order to follow. The increase in current could be avoided by first changing the AC voltage level so as to change the type of current control from A to B or vice versa, thus shifting current control to the opposite end. In the event the reversal in power is initiated at the end not in control of current, a change in polarity of the voltage will accomplish the desired result and there will be no change in DC line current magnitude. This also would be the normal method for planned power reversal.

Figure 6:
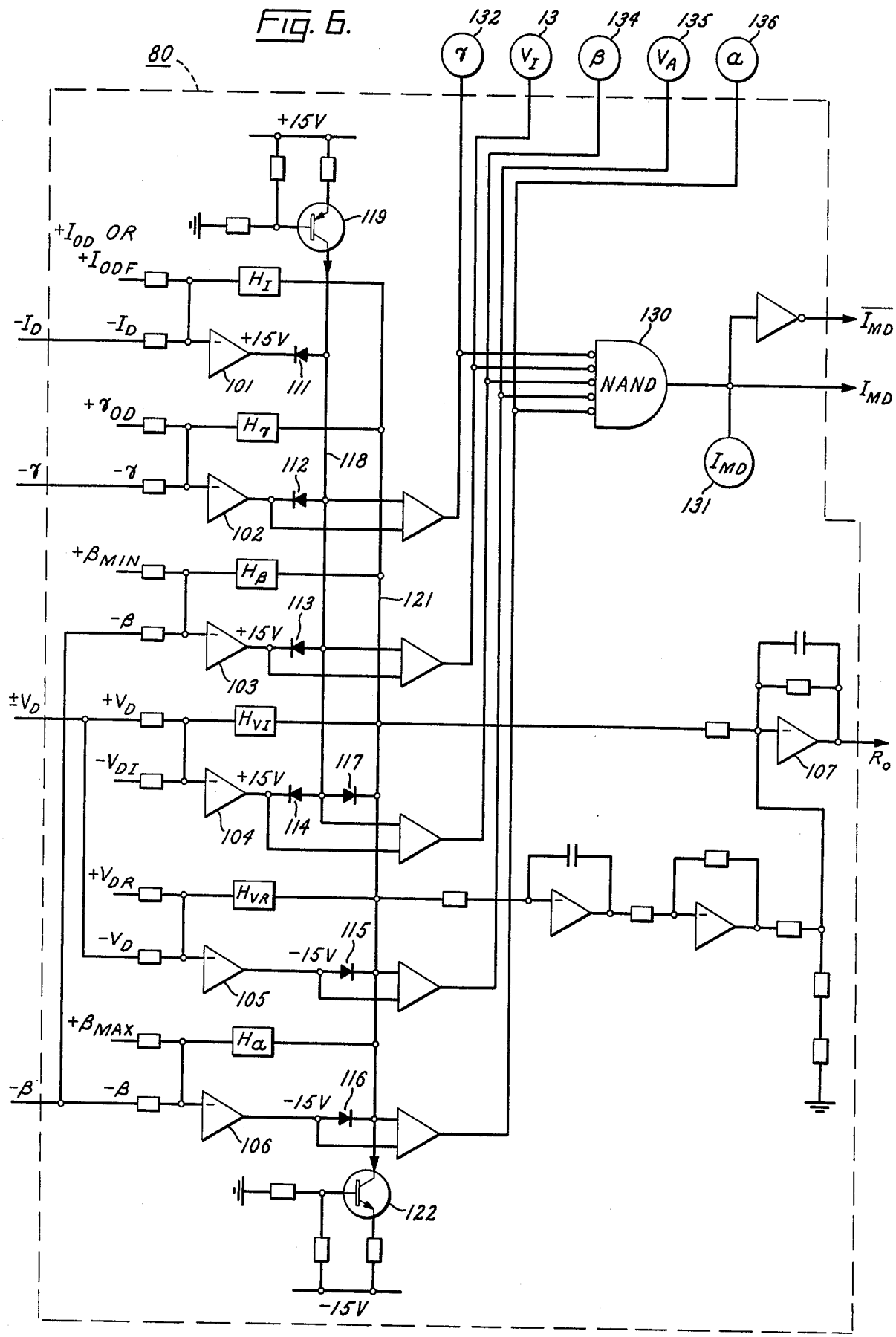
FIG. 6 is a functional block diagram showing the construction of a regulator used to control operation of the power converter shown in FIG. 2.

FIG. 6 is a schematic circuit diagram showing certain details of construction of the regulator 80 for deriving at its output of regulating output signal $R_O$ for supply to the firing time computer of the HVDC power converter. The regulator 80 is comprised by a plurality of input operational amplifiers including summing amplifier 101 shown partially in FIG. 2 and amplifiers 102 thru 106. Amplifiers 101 thru 106 are connected to operate as summing circuits for developing at their output terminals error signals representative of any difference in the magnitude values of a controlling parameter input signal and a corresponding reference value input signal for that particular controlling parameter. The summing amplifier 101 has supplied to its input the measured actual value of the transmission line current $-I_D$ together with a reference or ordered value of line current $+I_{OD}$ or $+I_{ODF}$ and derives at its output an error signal representative of any difference in magnitude in the two input signals. The error signal then is applied through a value ranking circuit for determining whether that error signal will be supplied as a regulating output $R_O$ from an output operational amplifier 107 to the input of the FTC 39 as shown in FIG. 2.

The summing amplifier 102 has two input signals representative of the measured actual value of the margin angle $(-\gamma)$ supplied thereto together with an ordered value of margin angle $(+\gamma_{OD})$. The input amplifier 103 has the measured value of the inverter firing angle $(-\beta)$ applied thereto together with an ordered minimum value of converter firing angle $(+\beta_{MIN})$, and the input amplifier 104 has supplied to its summing input the measured value of the direct current transmission line voltage $+V_D$ together with an ordered value for the direct current voltage at the inverter end $(-V_{DI})$. Input amplifier 105 has supplied to its summing inputs the negative value $-V_D$ representative of the measured value of the DC line voltage at the rectifier end together with an ordered value of DC line voltage at the rectifier end $(+V_{DR})$. The input amplifier 106 has supplied to its two summing input terminals the measured value of the inverter firing angle $(-\beta)$ together with an ordered value representative of the maximum order firing angle $(+\beta_{MAX})$.

All the input amplifiers 102, 103 and 104 have their outputs connected through respective coupling diodes 111-114 to a bus 118 that is supplied by a positive current source comprised by the PNP transistor 119. The bus 118 in turn is coupled through a coupling diode 117 to a second bus 121 to which coupling diodes 115 and 116 in the outputs of the input amplifiers 105 and 106, respectively, also are coupled. The bus 121 is supplied from a negative current source comprised by an NPN transistor 122. The arrangement is such that the coupling diodes 111-114 perform a diode logic function in selecting the error output signal from the amplifiers 101-104 which is most positive in polarity and coupling that output through the coupling diode 117 to the bus 121. The diodes 115, 116 and 117 then comprise a diode logic circuit for determining that error output signal supplied from diodes 115, 116 and 117 which is most negative in value and applying it to the input of output amplifier 107 as the output regulating control signal $R_O$. For a more detailed description of this logic signal selection process, reference is made to the above-identified U.S. Pat. No. 3,832,620 to Pollard.

From the foregoing brief description of the construction and operation of the regulator 80, it will be appreciated that output indications of whichever regulating mode is controlling system operation, can be obtained by sensing which of the output coupling diodes 111-116 is conducting. This sensed signal then is supplied through output amplifying stages to suitable regulating mode indicators shown at 131-136 for providing an output indication to an operator of the system as to which regulating mode the system is operating in. These outputs additionally can be used in connection with the various regulating subsystems as needed.

In order to obtain an output regulating mode indicating signal indicative of operation of the system in the current control mode and which is unique to that particular mode only, it is necessary to supply all of the other mode indicating signals to the input of a NAND gate 130. NAND gate 130 provides an output signal $I_{MD}$ representative of operation of the system in the current control mode only when all of the other remaining five modes of regulation are not present as an input to the NAND gate 130. It is this current control regulating mode detection signal which is supplied back through the output conductor 75 shown in FIG. 2 of the drawings and the delay 76 to the solenoid winding 77 of the switching relay 53 or other solid state switching network for switching over control of the system from a floating current order to either a local or remote generated power order as described previously with respect to FIG. 2 of the drawings.

Figure 7:
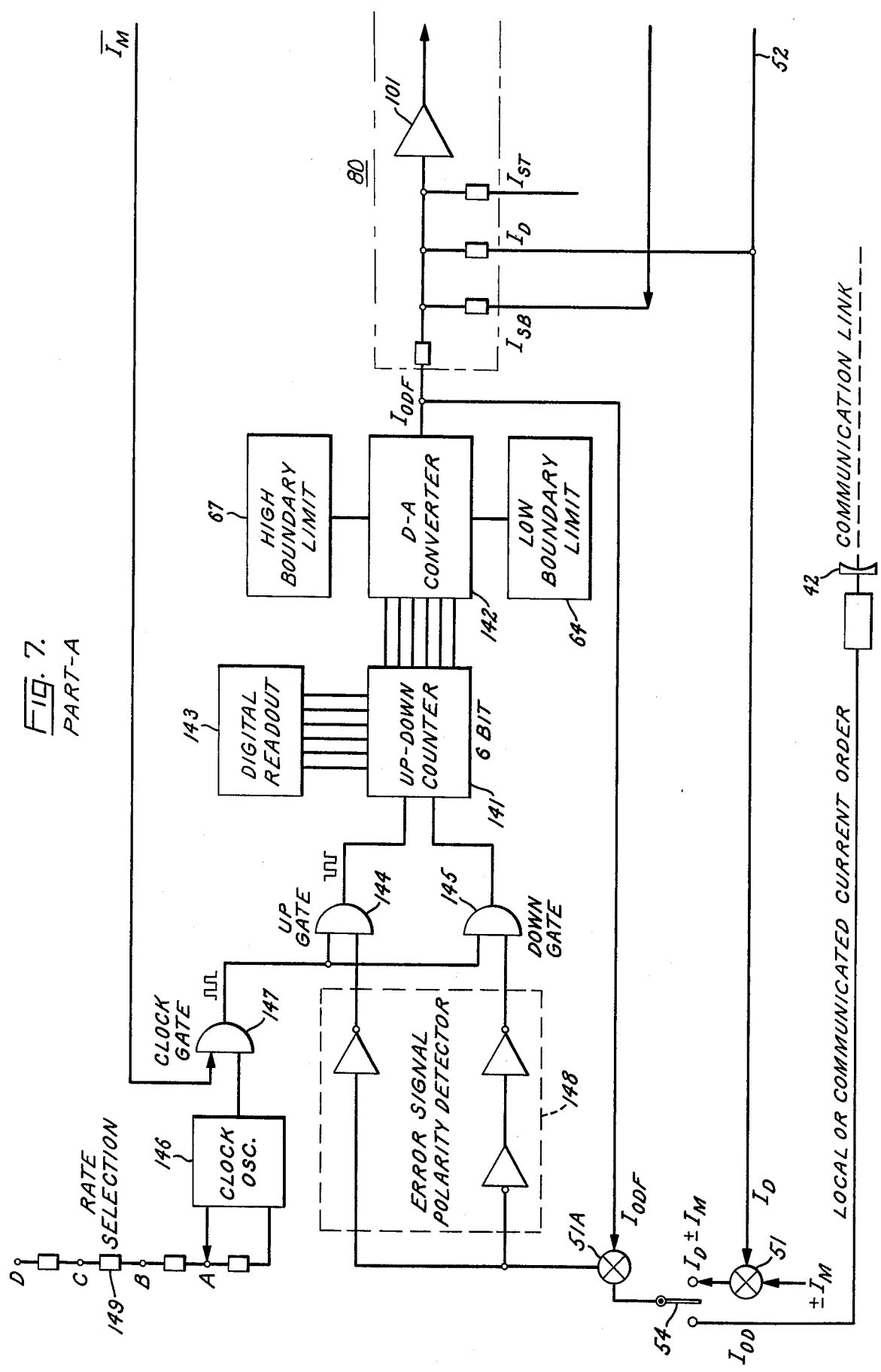
FIG. 7 is a schematic functional block diagram of an HVDC power converter having a digitally operated floating current order control subsystem constructed in accordance with the invention for use in an HVDC power transmission system of the type shown in FIG. 1.

FIG. 7 is a schematic functional block diagram of a digital form of HVDC power transmission system power converter employing a digital floating current order control subsystem. The HVDC power converter illustrated in FIG. 7 is similar in many respects to that described with relation to FIG. 2 in that it includes the HVDC power bridge comprised by the controllable electrical valves $35_1$ through $35_6$ connected between an AC system power supply transformer 36 and an HVDC link comprised by the direct current power conductors 11A and 11B. The power converter further includes a valve firing system 38, firing time computer 39 and regulator 80, all of which are similar in construction and operation to the corresponding components described with respect to FIG. 2. However, in place of the floating current order analog ramp generator employed in the circuit embodiment shown in FIG. 2, the system of FIG. 7 employs a digitally operated up-down counter 141 whose output is supplied through a digital to analog converter 142 to derive the floating current order control signal $I_{ODF}$ for application to the input of the output summing amplifier 101. The output from summing amplifier 101 is provided as the current mode regulating input signal in the regulator 80 as explained previously with respect to FIG. 2. The up-down counter 141 may comprise any conventional, commercially available, integrated circuit digital counter such as the SN54193 manufactured and sold by the Texas Instrument Corporation, and similarly the digital to analog converter 142 may comprise any standard, commercially available digital to analog converter such as the No. 4021 converter manufactured and sold by the Teledyne Corporation. If desired, a digital display shown at 143 may be employed in conjunction with the up-down converter 141 for viewing by an operator of the system.

The digital up-down counter 141 is preceeded by an up-count gate 144 of standard construction whose output is connected to the up-count input terminals of counter 141. A down-count gate 145 has its output terminal connected to the down-count input terminal of the counter 141. One set of enabling input terminals of the up and down gates 144 and 145 is connected in common to the output from a clock signal oscillator 146 through a clock signal enabling gate 147. The clock enabling gate 147 in turn has its count signal input terminal connected to the output from the clock oscillator 146 and a second enabling input terminal connected to the not $I_M$ regulating mode detection signal ($\overline{I}_M$) which is derived from the regulator 80 in the manner best seen in FIG. 6 of the drawings. The $\overline{I}_M$ signal will be present only during intervals while the power converter is not operating in the current control mode and will be removed (go to 0) upon switching to floating current order control. The remaining set of enabling input terminals of the up and down gates 144 and 145 are connected to the output of an error signal polarity detector 148 of conventional construction and which is supplied with the error control signal appearing at the output of the summing amplifier 51A. Summing amplifier 51A sums together the floating current order control signal $I_{ODF}$ appearing at the output of the D to A converter 142 with either a communicated current order signal $I_{OD}$ or alternatively the summed output signal $I_D \pm I_M$ appearing at the output of a summing amplifier 51, depending upon the setting of the selector switch 54. The summing amplifier 51 sums together the actual measured value of the DC line current $I_D$ derived from line current sensor 27 through filter circuit 50 and a reference current margin value $\pm I_M$ obtained from a suitable current source such as a potentiometer set by an operator of the system.

To complete the digital form of floating current order control subsystem a rate selection means is provided and is comprised by a variable potentiometer 149 whose output determines the frequency of the clock oscillator 146 output signal pulses supplied through up-down gates 144 to up-down counter 141. By varying the frequency or repetition rate of the clock signal pulses supplied from clock oscillator 146 the rate of change of the count set in the up-down counter 141 can be varied to thereby adjust or limit the rate of change of the floating current order control output signal $I_{ODF}$ appearing at the output of the D to A converter 142. Also the high and low boundary limit circuits 67 and 64, respectively are connected to the input of the D to A converter 142. Finally, a voltage interruption detector and voltage interruption ramp down circuit 90 also is included and is supplied from a DC line voltage monitor 41 for providing a voltage interruption ramp down current controlling signal $I_{SB}$ to the input of the output summing amplifier stage 71 in a manner similar to FIG. 2.

In operation, the system of FIG. 7 functions in the following manner, assuming the selector switch 54 to be set to the output of the first summing amplifier 51 whereby the system is conditioned to operate in a floating current order control mode. Initially, the count set in the up-down counter 141 will be at a count value corresponding to the ordered value of HVDC line current ± the current margin (± $I_M$) depending upon the direction of power flow and whether the converter is being operated as a rectifier or as an inverter, as explained previously with respect to FIG. 2. This initial or median count value will be converted by D to A converter 142 to a corresponding analog floating order control signal $I_{ODF}$ that is summed or compared to the measured actual value of the DC line current $I_D$ and any error difference supplied through the output stage summing amplifier 71 as a current mode regulating input in the regulator 80.

During normal running, the measured actual value of the DC line current $I_D$ also is supplied back to the summing amplifier 51 where it is summed together with the current margin ± $I_M$. The resultant value is supplied through the second summing amplifier stage 51A where it is compared or summed together with the then existing value of the floating current order control signal $I_{ODF}$. Any error between the two signals is then supplied through the error signal polarity detector and either through up-gate 134 or down-gate 145, depending upon the polarity of the error signal, to thereby cause up-down counter 141 to count up or count down from its median set value identified above. This results in changing the output value of the floating current order control signal $I_{ODF}$ appearing at the output of the D to A converter 142 so that it corresponds precisely to the measured value of line current plus or minus the current margin as desired.

During such normal operation of the system, the regulator 80 will be operating either in the voltage control mode, or some other mode other than current control mode. As a consequence, the enabling signal $\bar{I}_M$ will be present at the input of the clock gate 147. Consequently, during normal operation, clock signal pulses will be supplied from the clock oscillator 146 through the clock gate 147 and up-down gates 144, 145 to cause up-down counter 141 to change its count as described above. In the event of a disturbance or change in operating condition which causes regulator 80 to switch to the floating current order control mode thus relying upon the floating current order signal $I_{ODF}$ at whatever value it then happens to be, the regulation mode detection signal $\bar{I}_M$ will disappear thereby disenabling or inhibiting the clock gate 147. Accordingly, whatever count is then stored in the up-down counter 141 will remain in the counter and it serves as a memory to operate the power converter at the last sensed value of the DC line current. The system will then remain in this condition until such time that the regulator 80 is switched back to some other mode of regulation other than current control mode, in which event the system is restored to its normal operating condition. In the event of a severe dip or loss of DC line voltage, the voltage interruption detector and voltage interruption ramp-down circuitry 90 will take over and cause the regulator to ramp-down the value of the DC line current to the minimum value established by circuit 90. By adjusting the frequency or repetition rate of clock signal pulses supplied by clock oscillator 46 through appropriate adjustment of the potentiometer 149, the rate at which the count in up-down counter 141 changes can be controlled or limited to some predetermined value thereby imposing a rate of change limitation on the ability of the floating current order control signal $I_{ODF}$ to follow fluctuations or changes in the measured actual value of the DC line current. The high and low boundary limit circuits 67 and 64, respectively, limit the absolute magnitude value of the line current to which counter 141 can raise or lower the current.

Various modifications of the system shown in FIG. 7 are possible. One practical modification of the system shown in FIG. 7 would allow the up-down counter 141 to serve as a non-mechanical stepping switch to replace the stepping switches now used to insure that current orders at the opposite HVDC terminals are maintained the same. In such modification, the up and down clock signal input gates 144 and 145 would be replaced by an up monostable multivibrator and a down monostable multivibrator so that the count in counter 141 could be changed by one count at a time only. The enabling gates of the up or down monostable multivibrator would be enabled only if the up-down counter at the opposite terminal of the HVDC system agreed with the count stored in the counter at the terminal where the current order originated. This comparison of the digital count information would have to be made by way of a communication system. If the error detector at the originating terminal indicated the need for a change and agreement in the count stored by the up-down counter 141 at the opposite terminal was verified, the local counter then would be allowed to advance one count, and at the same time a signal would be communicated to the opposite terminal to advance its count by one bit. As soon as the local terminal has advanced one count, there would be disagreement in the count stored in the up-down counters because of the delay in the communication system. Therefore, no further change could occur until a corresponding change had been completed in the count stored at the opposite terminal and had been verified. In any such modification, the maximum rate of change that would be allowed in the floating current order control signal would be limited by the speed of the communication system thereby rendering the control more dependent on the communications system than otherwise is the case with the system of FIG. 7.

From the foregoing description it will be appreciated that the invention mades available a new and improved HVDC power transmission system utilizing power converters employing a novel floating current order control subsystem. The floating current order control subsystem operates to maintain a continuously available floating current order control signal which is representative of the magnitude of the direct current flowing in the HVDC link power conductors at any given instant plus or minus a predetermined current margin. This floating current order control signal goes up or down in magnitude (floats) with normally ordered changes in the HVDC system direct current magnitude and is provided as one of the operation regulating input control signals to the regulator of the power converters of the HVDC system for use by that power converter which is not in control of current for the system. In the event of a need to change the current flowing in the system in the absence of communication, or in the event of a regulating mode change requiring shift of current control to the power converter previously not in control of current, nearly "bumpless" shift of current control is possible without requiring existence of a communication link between the remotely situated power converters thereby insuring against unintentional reversals in power flow upon such occurrances.

Having described two different embodiments of an HVDC power transmission system employing a novel floating current order control subsystem constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. In an HVDC electric power delivery system including power converter means at each terminal of the system; each converter means comprising: a plurality of controllable electric valves connected between alternating current and direct current electric power conductors, means for cyclically firing said valves in a predetermined sequence and at firing angles measured with respect to the alternating voltage that can be varied to control the flow of power between said alternating current and direct current power conductors, and regulator means for comparing a plurality of control signals which respectively represent different operating characteristics of the HVDC system during operation and for deriving an output error control signal for controlling the firing angle of said valves, the regulator means associated with one of said converter means receiving as one input a current order control signal for controlling the current transmitted by said system; the improvement comprising:

(a) floating current order control means coupled to the regulator means of the power converter means not in control of current for the HVDC system for supplying to said latter regulator means as one of its input control signals a floating current order control signal for controlling the current ordered from said latter converter means, (b) said floating current order control signal being responsive to and dependent upon the magnitude of the direct current flowing through said direct current power conductor plus a current margin signal having a predetermined magnitude and a positive polarity with power flow in the system in one direction and a negative polarity with the power flow in the system in the opposite direction, and (c) said floating current order control means and the regulator means associated therewith being capable of acting to control the current ordered from said latter converter means without relying upon receipt of said current order control signal at said latter converter means.

2. An HVDC electric power delivery system according to claim 1 wherein said floating current order control means includes current sensing means coupled to the direct current electric power conductors for deriving a measured line current feedback signal representative of the actual measured value of the magnitude of the direct current flowing in the direct current power conductors and summing circuit means for combining the measured line current signal with said predetermined current margin signal whose magnitude is representative of the value of a desired current margin and whose polarity is dependent upon the direction of power flow through the HVDC system whereby changes may be made in the level of the direct current transmitted by the system even in the absence of communications between the two terminals of the system without risk of undesired reversal in the direction of power flow.

3. An HVDC electric power delivery system according to claim 1 wherein said floating current order control means further comprises rate limiting means for limiting the rate of change of the floating current order control signal to some predetermined rate of change value either in an increasing or decreasing magnitude value direction.

4. An HVDC electric power delivery system according to claim 1 wherein said floating current order control means further includes maximum and minimum boundary setting means for setting predetermined maximum and minimum magnitude values to which said floating current order control signal is allowed to change corresponding to predetermined maximum and minimum values of load current magnitude which said power delivery system can deliver.

5. An HVDC electric power delivery system according to claim 1 wherein said floating current order control means further comprises rate limiting means for limiting the rate of change of the floating current order control signal to some preset rate of change value, and maximum and minimum boundary setting means for setting the maximum and minimum magnitude values to which said floating current order control signal is allowed to change corresponding to predetermined maximum and minimum values of load current magnitude which said power delivery system can deliver.

6. An HVDC electric power delivery system according to claim 2 wherein said floating current order control means further includes rate limiting means responsive to the output from said summing circuit means for limiting the rate of change of the floating current order control signal to some predetermined rate of change value either in an increasing or decreasing magnitude value direction.

7. An HVDC electric power delivery system according to claim 2 wherein said floating current order control means further includes boundary means coupled to and controlling operation of said summing circuit means for limiting the magnitude of the derived floating current order control signal between some predetermined maximum and minimum values corresponding to maximum and minimum values of magnitude of load current which the power delivery system can deliver.

8. An HVDC electric power delivery system according to claim 2 wherein said floating current order control means further includes rate limiting means responsive to the output from said summing circuit means for limiting the rate of change of the floating current order control signal to some predetermined rate of change value and further including boundary means coupled to and controlling operation of said summing circuit means for limiting the magnitude value of the floating current order control signal to predetermined maximum and minimum values corresponding to predetermined maximum and minimum values of magnitude of load current which the power delivery system can deliver.

9. An HVDC electric power delivery system according to claim 1 wherein said floating current order control means further includes DC voltage interruption detector means coupled to said direct current electric power conductor for detecting interruption of the DC voltage and deriving a DC voltage interruption control signal and means responsive to said DC voltage interruption control signal for overriding said floating current order control signal in the control of said regulator means and reducing the magnitude of the load current flowing in the system to a predetermined low value.

10. An HVDC electric power delivery system according to claim 9 wherein said DC voltage interruption detector means further includes DC voltage interruption control signal rate limiting means for limiting the rate of change of said DC voltage interruption control signal prior to its application to said means for overriding the floating current order control signal and boundary means acting on said rate limiting means for limiting the DC voltage interruption control signal to a predetermined minimum value corresponding to a minimum value of load current.

11. An HVDC electric power delivery system according to claim 8 wherein said floating current order control means further includes DC voltage interruption detector means coupled to said direct current electric power conductors for detecting interruption of the DC voltage and deriving a DC voltage interruption control signal, means responsive to said DC voltage interruption control signal for overriding said floating order control signal in the control of said regulator means and reducing the magnitude of the load current flowing in the system to a predetermined low value, DC voltage interruption control signal rate limiting means for limiting the rate of change of said DC voltage interruption control signal prior to its application to said means for overriding the floating current order control signal and boundary means acting on said DC voltage interruption control signal rate limiting means for limiting the DC voltage interruption control signal to a predetermined minimum value.

12. An HVDC electric power delivery system according to claim 1 wherein said floating current order control means further includes stop current order control circuit means coupled to the regulator means for overriding said floating current order control signal in the operation of said regulator means.

13. An HVDC electric power delivery system according to claim 11 wherein said floating current order control means further includes stop current order control circuit means coupled to regulator means for overriding said floating current order control signal in the operation of said regulator means.

14. An HVDC electric power delivery system according to claim 1 wherein said floating current order control means further includes means providing a communication link to the regulating means of the remote power converter for providing remote current order information as an input for said floating current order control means.

15. An HVDC electric power delivery system according to claim 8 wherein said floating current order means further includes means providing a communication link to the regulating means of the remote power converter for providing remote current order information as an input to said floating current order control means.

16. An HVDC electric power delivery system according to claim 13 wherein said floating current order control means further includes means providing a communication link to the regulating means of the remote power converter for providing remote current order information as an input to said floating current order control means.

17. An HVDC electric power delivery system according to claim 1 wherein said floating current order control means comprises a digitally operated up-down counter and a digital-to-analog converter, said up-down counter having its output supplied through the digital-to-analog converter to control the regulator means, summing circuit means having supplied thereto a feedback signal representative of the magnitude of the direct current flowing through the direct current power conductor and a predetermined current margin signal for deriving an output analog floating current order signal that is applied to an enabling input terminal of said up-down counter, a source of digital clock signals connected to a clock signal input terminal of the up-down counter for causing the same to count up or down depending upon the polarity of the analog floating current order signal, and polarity sensitive gate means connected intermediate the summing circuit means and the enabling input terminal of the up-down counter to cause the same to count either up or down dependent upon the polarity of the floating current order signal.

18. An HVDC electric power delivery system according to claim 17 further including means for adjusting the frequency of the digital clock signals supplied to the clock signal input terminal of the up-down counter to thereby control the rate of change of the floating current order control signal derived from the output of the digital-to-analog converter.

19. An HVDC electric power delivery system according to claim 18 further including voltage interruption detector means coupled to the direct current electric power conductor for sensing interruptions in direct current voltage and for deriving an output voltage interruption control signal indicative thereof and means for applying said voltage interruption control signal to said regulator means to control operation of the power converter means in a manner to reduce automatically the magnitude of the current flowing in the system.

20. An HVDC electric power delivery system according to claim 19 wherein said means for applying the voltage interruption control signal to the regulator means includes rate limiting means for limiting the rate of change at which said voltage interruption control signal is allowed to reduce the current output from the power converter means in response to the voltage interruption control signal, and absolute value boundary means coupled to said rate limiting means for fixing a minimum value current magnitude beyond which the voltage interruption control signal can no longer change the operation of the power converter means to reduce current flowing in the system.

21. A floating current order control for use in: an HVDC electric power delivery system of the type employing at each terminal of the system power converter means connected between alternating current and direct current electric power conductors for controlling the flow of electric power between said alternating current and direct current electric power conductors, one converter means usually being in control of the direct current transmitted by said system at a given instant during system operation, said floating current order control comprising:

(a) direct current sensing means for sensing the magnitude of the direct current flowing in the direct current electric power conductors and deriving a feedback control signal representative of the actual measured value of direct current magnitude.

(b) current margin signal generating means for deriving a current margin signal whose magnitude is representative of a desired value of current margin magnitude and whose polarity is either positive or negative dependent upon the desired direction of power flow through the power converter means, and (c) combining circuit means for combining said feedback control signal and said current margin signal and deriving a floating current order control signal for use in controlling the current ordered from the power converter means not then in control of system current, (d) said floating current order control means acting to control the current ordered from said latter converter means without relying upon receipt at said latter converter means of the current order control signal used for controlling said one converter means.

22. A floating current order control according to claim 21 wherein said floating current order control includes rate limiting means for limiting the rate of change of said floating current order control signal whereby the rate at which said floating current order control signal is allowed to change from a preexisting value is limited.

23. A floating current order control according to claim 21 wherein said floating current order control includes boundary limit setting means for fixing maximum and minimum magnitude values to which said floating order control signal is allowed to change to thereby limit the corresponding maximum and minimum values of direct current flowing in the HVDC system.

24. A floating current order control according to claim 23 wherein said floating current order control further includes rate limiting means for limiting the rate of change of said floating current order control signal whereby the rate at which said floating current order control signal is allowed to change from a preexisting value is limited.

25. A floating current order control according to claim 21 further including voltage interruption detector means adapted to be coupled to a direct current electric power conductor for sensing interruption of direct current voltage and for deriving an output voltage interruption control signal indicative thereof and means for applying said voltage interruption control signal to control operation of a power converter means in a manner to reduce current flowing in an HVDC system.

26. A floating current order control according to claim 25 wherein said means for applying the voltage interruption control signal includes rate limiting means for limiting the rate of change at which said voltage interruption control signal is allowed to reduce current output from a power converter means, and absolute value boundary means for fixing a minimum value current magnitude beyond which the voltage interruption control signal can no longer reduce current output from a power converter means.

27. A floating current order control according to claim 24 further including voltage interruption detector means for coupling to a direct current electric power conductor for sensing interruption of direct current voltage and for deriving an output voltage interruption control signal indicative thereof and means for applying said voltage interruption control signal to control operation of a power converter means in a manner to reduce current flowing in an HVDC system.

28. A floating current order control according to claim 27 wherein said means for applying the voltage interruption contol signal includes rate limiting means for limiting the rate of change at which said voltage interruption control signal is allowed to reduce current output from a power converter means and absolute value boundary means for fixing a minimum current value magnitude beyond which the voltage interruption control signal can no longer reduce current output from a power converter means.

29. A floating current order control according to claim 28 further including stop current order control means for overriding said floating order control signal and for reducing output form the power converter to nearly zero current level without delay.

30. A floating current order control according to claim 21 wherein said means for deriving a floating current order control signal comprises a digitally operated up-down counter and up-down input gate means, said up-down counter having its up and down count input terminals connected respectively to the outpus from the up and down gate means and the up and down gate means having their respective inputs connected to the output from said combining circuit means, a source of clock signals having a known repetition rate connected through said up-down gate means to clock signal input terminals of said up and down counter and a digital to analog converter connected to the output from said up-down counter for converting the digital count recorded therein to a corresponding analog current order control signal.

31. A floating current order control according to claim 30 further including means for varying the repetition rate of the source of clock signals applied to the clock signal enabling input terminals of said up-down counter to thereby vary the rate of change of the digital count stored in the digital up-down counter and hence the rate of change of magnitude of the corresponding output floating current order control signal.

32. A floating current order control according to claim 31 further including voltage interruption detector means for coupling to a direct current electric power conductor for sensing interruption of the direct current voltage and for deriving an output voltage interruption control signal indicative thereof and means for applying said voltage interruption control signal to reduce automatically the current output from a power converter means.

33. A floating current order control according to claim 32 wherein said means for applying the voltage interruption control signal includes rate limiting means for limiting the rate of change at which said voltage interruption control signal is allowed to reduce the current output from a power converter means, and absolute value boundary means for fixing a minimum value current magnitude beyond which the voltage interruption control signal can no longer reduce the current output from a power converter means to reduce power output.

34. In an HVDC ekectric power delivery system including power converter means at each terminal of the system, each of said power converter means comprising a plurality of controllable electric valves connected between alternating current and direct current electric power conductors and means for cyclically firing said valves in a predetermined sequence and at firing angles measured with respect to the alternating voltage that can be varied to control the flow of power between said alternating current and direct current power conductors and having regulator means for each of said power converter means for comparing a plurality of control signals which respectively represent different operating characteristics of the HVDC system during operation and for deriving an output error control signal for controlling the firing angle of said valves; the improvement comprising;

(a) floating current order control means for each of said power converter means for supplying to the regulator means of the power converter means not then in control of current for the system a floating current order control signal, (b) said floating current order control signal being responsive to and dependent upon the magnitude of the direct current flowing through said direct current power conductors plus a current margin signal, (c) said floating current order control means for the respective power converter means at each terminal of the system including means for supplying a current margin signal of known magnitude and either positive or negative polarity dependent upon the direction of power flow through the respective power converter means whereby changes may be made in the level of the direct current transmitted by the system even in the absence of communications between the two terminals without risk of undesired reversal in the direction of power flow, and (d) said floating current order control means for each individual converter means and the regulator means associated therewith being capable of acting to control the current ordered from the associated converter means when not in control of system current without relying upon receipt at said latter converter means of the current order control signal used for controlling the particular converter means that is then in control of system current.

* * * * *